United States Patent Office 3,751,434
Patented Aug. 7, 1973

3,751,434
DERIVATIVES OF 2H-PYRAN-3(6H)-ONES
Yvon Lefebvre, Pierrefonds, Quebec, Canada, assignor to American Home Products Corporation, New York, N.Y.
No Drawing. Continuation-in-part of application Ser. No. 78,196, Oct. 5, 1970, now Patent No. 3,657,226, which is a continuation-in-part of application Ser. No. 5,883, Jan. 26, 1970, now abandoned, which in turn is a continuation-in-part of application Ser. No. 748,196, July 29, 1968, now Patent No. 3,547,912. This application Apr. 7, 1971, Ser. No. 132,196
Int. Cl. C07d 7/10
U.S. Cl. 260—345.9
37 Claims

ABSTRACT OF THE DISCLOSURE

Compounds of the formula

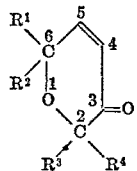

in which $R^1$ and $R^2$ together represent oxo; or $R^1$ represents hydrogen and $R^2$ represents a hydroxyl, lower alkanoyloxy, p-nitrobenzoyloxy or chloroacetoxy, lower alkoxy, lower alkoxy(lower)alkoxy, benzyloxy or tetrahydropyranyloxy; or $R^1$ represents a lower alkyl, aryl or substituted aryl and $R^2$ represents a hydroxyl, lower alkoxy, lower alkoxy(lower)alkoxy, benzyloxy or tetrahydropyranyloxy; $R^3$ represents hydrogen and $R^4$ represents lower alkyl, substituted lower alkyl, cyclo(lower) alkyl, aryl, substituted aryl, aralkyl, substituted aralkyl; or $R^3$ and $R^4$ each represent hydrogen or the same or different organic radicals described above; or $R^3$ and $R^4$ together represent a carboxylic ring, attached in a spiral fashion to the 2H-pyran-3(6H)-one ring so that the carbon atom 2 of the pyranone ring is common to the carbocyclic ring. The compounds have antibacterial and antifungal activities, and methods for their preparation and use are also disclosed.

This application is a continuation-in-part of my earlier-filed U.S. patent application Ser. No. 78,196 filed Oct. 5, 1970, now U.S. Pat. No. 3,657,226, issued Apr. 18, 1972, which is a continuation-in-part of my U.S. patent application Ser. No. 5,883, filed Jan. 26, 1970, now abandoned which is a continuation-in-part of my U.S. patent application Ser. No. 748,196 filed July 29, 1968, now U.S. Pat. No. 3,547,912, issued Dec. 15, 1970. The purpose of this application is to specifically disclose and claim a portion of the disclosure in said earlier-filed U.S. patent applications.

BACKGROUND OF THE INVENTION

This invention relates to new and useful derivatives of 2H-pyran-3(6H)-one, to a process for preparing these compounds and to intermediates used in their preparation.

The compounds of this invention have valuable pharmacologic properties. For example, these derivatives exhibit antibacterial and antifungal activities at dose levels which do not produce deleterious side effects. These properties render the compounds of this invention useful as therapeutic agents.

SUMMARY OF THE INVENTION

The compounds of this invention are 2H-pyran-3(6H)-one derivatives which may be represented by general Formula I

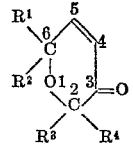

(I)

in which $R^1$ and $R^2$ together represent oxo; or $R^1$ represents hydrogen and $R^2$ represents a hydroxyl, a lower alkanoyloxy, p-nitrobenzoyloxy or chloroacetoxy, a lower alkoxy, a lower alkoxy(lower-alkoxy, benzyloxy or a tetrahydropyranyloxy; or $R^1$ represents a lower alkyl, an aryl such as phenyl, or a substituted aryl such as p-chlorophenyl and $R^2$ represents a hydroxyl, a lower alkoxy, a lower alkoxy(lower)alkoxy, benzyloxy or a tetrahydropyranyloxy; $R^3$ and $R^4$ are selected independently from the group consisting of hydrogen, lower alkyl, a substituted lower alkyl such as a chloromethyl or a 3-methyl-2-oxiranyl; a cyclo(lower)alkyl, or one of the following aromatic radicals: 9-anthryl, p-terphenyl-4-yl, phenyl, phenyl substituted with a nitro or a 2-bromoethoxy or with one or two lower alkyl, halogen, hydroxy, lower alkoxy and benzyloxy, for example, p-tolyl, 3,4-xylyl, 2-ethylphenyl, 4-isopropylphenyl, p-chlorophenyl, p-fluoro-p-hydroxyphenyl, 2-bromoethoxyphenyl, 4-methoxyphenyl p - hydroxyphenyl, 2 - bromoethoxyphenyl, 4 - methoxyphenyl, 4-ethoxyphenyl, 4-propoxyphenyl, 3,4-dimethoxyphenyl, p-benzyloxyphenyl and 3,4-dibenzyloxyphenyl;

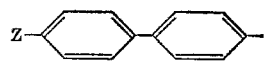

wherein Z is selected from the group consisting of hydrogen, hydroxyl, and lower alkoxy, for example, 4'-bromo-(4-biphenylyl), 4'-chloro(4-biphenylyl), 4'-hydroxy-(4-biphenylyl), 4'-methoxy(4-biphenylyl), 4'-ethoxy(4-biphenylyl) or 4'-propoxy-(4-biphenylyl); a benzyl, α-methylbenzyl, α-hydroxybenzyl, diphenylmethyl, (2-dichloro) diphenylmethyl, (3,4 - dichloro)diphenylmethyl, 4,4'-dichlorodiphenylmethyl, 4-biphenylylmethyl, 4'-bromo-(4-biphenylylmethyl), 4' - chloro-(4-biphenylmethyl), phenethyl, 5-indanyl, 5-(10,11-dihydro-5H-dibenzo[a,d]cycloheptenyl) or 2-dibenzofuryl; or $R^3$ and $R^4$ are concatenated with the carbon atom to which they are attached in a spiral fashion forming a carboxylic ring system selected from the group consisting of cyclopentane, cyclohexane, 2-chlorocyclohexane, fluorene, 5H - dibenzo[a,d]cycloheptene, 10,11-dihydro-5H-dibenzo[a,d]cycloheptene and 1,6,7,11b - tetrahydro-11bH-dibenz[cd,h]azulene, the lost five ring systems being concatenated at carbon atoms 1, 9, 5, 5, and 2 of the respective carbocyclic ring systems.

When used herein and in the appended claims, the term "lower alkoxy" contemplates the hydrocarbonoxy radicals, straight and branched chain, containing from about 1 to about 10 carbon atoms, and includes methoxy, ethoxy, n-propoxy, i-propoxy, n-butoxy, t-butoxy, n-pentoxy, n-hexoxy, 2-methylpentoxy, and the like. The term "lower alkanoyloxy" contemplates hydrocarbonoyloxy radicals, straight and branched chain, containing from about 2 to 7 carbon atoms, and includes acetoxy, propionyloxy, butyryloxy, hexanoyloxy, 2-methylpentoyloxy, and the like. The term "lower alkyl" contemplates hydrocarbon radicals, straight and branched chain, containing from about 1 to about 10 carbon atoms, and includes methyl, ethyl, n-propyl, i-propyl, n-butyl, t-butyl, n-pentyl, n-hexyl, 2-methylpentyl, and the like. The term "cyclo(lower)alkyl" contemplates saturated cyclic hydrocarbon radicals containing from about 3 to about 6 carbon atoms, and includes cyclopropyl, cyclobutyl, cyclopentyl, cyclohexyl, and the like. The term "halo" when used by itself or in association with lower alkyl, lower alkenyl, aryl or the like contemplates halogens, and includes fluorine, chlorine, bromine and iodine.

A preferred class of the useful compounds within the scope of this invention are the compounds of general Formula I, as described above, with the proviso that at least one of $R^1$, $R^3$ or $R^4$ is an aromatic radical as defined above, or $R^3$ or $R^4$ together represent a carbocyclic ring system.

The compounds of this invention are prepared by the following process. A furanmethanol of Formula III, see below, in which $R^1$ is a hydrogen, lower alkyl, aryl or substituted aryl and $R^3$ and $R^4$ are as defined above is treated with an oxidizing agent such as, for example, an organic peracid or hypohalous acid, or with an agent capable of furnishing the elements of a hypohalous acid in the prescence of water, to yield the corresponding 6-hydroxy-2H-pyran-3(6H)-one derivative of Formula I in which $R^1$ represents a hydrogen, lower alkyl, aryl or substituted aryl, $R^2$ represents the hydroxyl group, and $R^3$ and $R^4$ are as defined above, as represented in greater detail by Formula IV.

The starting materials of Formula III may conveniently be prepared by treating a compound containing a reactive carbonyl function of the Formula II, in which $R^3$ and $R^4$ are as defined above, with 2-furyllithium or in the case where $R^1$ is other than hydrogen with an appropriate 5-substituted-2-furyllithium.

If desired, the 6-hydroxy-2H-pyran-3(6H)-one derivative of Formula IV, in which $R^1$ is hydrogen, obtained as described above, may be further converted, as follows. Thus, oxidation of said last-named compounds of Formula IV, for example with hexavalent chromium ion, yields the corresponding 2H-pyran-3,6-diones of Formula I, in which $R^1$ and $R^2$ together represent a ketonic oxygen and $R^3$ and $R^4$ are as defined above, as shown in greater detail by Formula V.

In the above compounds of Formula I in which $R^1$ is hydrogen and $R^2$ is a hydroxyl, the hydroxyl may be subsequently esterified or etherified. In the above compounds of Formula I in which $R^1$ is lower alkyl, aryl or substituted aryl and $R^2$ is a hydroxyl, the hydroxy may be subsequently etherified.

DETAILED DESCRIPTION OF THE INVENTION

The compounds of this invention possess pharmacologic properties. More particularly, these compounds exhibit utility as antibacterial agents against a number of gram-positive and gram-negative microorganisms, such as, *Staphylococcus pyogenes*, both penicillin sensitive and penicillin resistant, *Sarcina lutea*, *Streptococcus fecalis*, *Escherichia coli*, *Aerobacter aerogenes*, *Salmonella pullorum*, *Proteus mirabilis* and *Proteus vulgaris* and as antifungal agents against a number of pathogenic fungi such as, *Candida albicans*, *Microsporum gypseum* and *Trichophyton granulosum*, in standard tests for antibacterial and antifungal activity, such as those described in "Antiseptics, Disinfectants, Fungicides and Sterilization," G. F. Reddish, ed., 2nd ed., Lea and Febiger, Philadelphia, 1957 or by D. C. Grove and W. A. Randall in "Assay Methods of Antibiotics," Med. Encycl. Inc., New York 1955.

For example, by employing a test like the serial broth dilution, see Grove and Randall, cited above, in which dilutions of the compounds of this invention in nutrient broth are inoculated with the microorganisms or fungi, described above, incubated at 37° C. for 2 days or 9 days, respectively, and examined for the presence of growth, it may be shown that 2-(4-biphenyl)-6-methoxy-2H-pyran-3-(6H)-one is able to inhibit growth totally in this system of *Staphylococcus pyogenes*, *Sorcina lutea*, and *Streptococcus fecalis* at a concentration of about 3.2 mcg./ml. and inhibit growth totally of *Candida albicans*, *Microsporum gypeum* and *Trichophyton granulosum* at 16 mcg./ml. or better. Similarly, 2-(4-bisphenyl)-6-hydroxy-2-methyl-2H-pyran-3(6H)-one acetate inhibits totally the growth of *Aerobacter aerogenes*, *Pseudomonas aeruginosa*, *Proteus mirabilis* and *Proteus vulgaris* at 25 mcg./ml. and the growth of *Candida albicans*, *Microsporum gypseum* and *Trichophyton granulosum* at 16 mcg./ml. or better.

When the compounds of this invention are employed as antibiotic or antifungal agents in warm-blooded animals, e.g. rats, alone or in combination with pharmacologically acceptable carriers, the proportion of which is determined by the solubility and chemical nature of the compound, chosen route of administration and standard biological practice. For example, they may be administered orally in solid form containing such excipients as starch, milk sugar, certain types of clay and so forth. They may also be administered orally in the form of solutions or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular host under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in a range of from about 0.1 mg. to about 100 mg. per kilo per day, although as aforementioned variations will occur. However, a dosage level that is in the range of from about 0.5 mg. to about 50 mg. kilo per day is most desirably employed in order to achieve effective results.

In addition, the agent may be employed topically. For topical application they may be formulated in the form of solutions, creams, or lotions in pharmaceutically acceptable vehicles containing 0.1–5 percent, preferably, 2 percent of the agent and may be administered topically to the infected area of the skin.

Also the antibacterial properties of the compounds of Formula I may be utilized for washing equipment in hospitals, homes and farms, instruments used in medicine and bacteriology, clothing used in bacteriological laboraties, and floors, walls and ceiling in rooms in which a background free of gram-positive and gram-negative microorganisms such as those listed above. When employed in this manner the compounds of this invention may be formulated in a number of compositions comprising the active compound and an inert material. In such compositions, while the compounds of Formula I of this invention may be employed in concentrations as low as 500 p.p.m., from a practical point of view, it is desirable to use from about 0.10% by weight, to about 5% by weight or more. In particular, useful compositions for use as washing solutions, the active compounds of this invention may be used generally in the range of from 0.50% to 2.5% by weight.

The formulations that may be used to prepare antiseptic wash solutions of the compounds of this invention are varied and may readily be accomplished by standard techniques, see for example, "Remington's Practice of Pharmacy," E. W. Martin et al., eds., 12th ed., Mack Publishing Company, Easton, Pa., 1961, pp. 1121–1150. In general, the compounds may be made up in stock solutions. They can also be formulated as suspensions in an aqueous vehicle. These make useful mixtures to decontaminate premises. Also, aqueous vehicles containing emulsifying agents, such as sodium lauryl sulfate, and relatively high concentrations, e.g., up to about 5% by weight, of the compounds may be formulated by conventional techniques.

A typical antiseptic preparation useful for disinfecting floors, walls, ceiling, and articles in a contaminated room may be prepared by adding 5 to 25 g. of 2-(4-biphenylyl)-

6-methoxy-2H-pyran-3(6H)-one to a mixture of 150 to 300 g. of polyethylene glycol 1540 and 150 to 300 g. of polyethylene glycol 300. The resulting mixture is stirred while a solution of 1 to 10 g. of sodium lauryl sulfate in 300 to 400 ml. of water is added portionwise. The article to be disinfected is coated or immersed in the preparation for a prolonged time, for example, one hour and then rinsed with sterile water.

The preferred starting materials for the compounds of this invention are simple ketones and aldehydes. These starting materials may be represented by general Formula II in which $R^3$ and $R^4$ are as defined above. Many of these starting materials are commercially available; the remaining starting materials are prepared by conventional methods. Such conventional methods for preparing ketones and aldehydes are described in textbooks on organic chemistry; for example, see P. Karrer, "Organic Chemistry," 2nd ed., Elsevier Publishing Co., Inc., New York, 1946, pp. 149–169 and V. Migrdichian, "Organic Synthesis," vol. 1, Reinhold Publishing Corp., New York, 1957, pp. 100–129.

Treatment of the above starting materials with 2-furyllithium or an appropriate 5-substituted-2-furyllithium in an inert solvent such as, for example, ether, toluene, tetrahydrofuran or hexane at a temperature preferably ranging from 0° C. to room temperature yields the furan derivatives of Formula III, see below.

2-furyllithium is prepared by the action of n-butyllithium upon furan at room temperature. Alternatively, 2-furyllithium is obtained by the action of n-butyllithium upon 2-bromofuran in ether at room temperature. In turn, 2-bromofuran is obtained by decarboxylation of 5-bromo-2-furoic acid by the method of A. F. Shepard et al., J. Am. Chem. Soc., 52 2083 (1930).

The appropriate 5-substituted -2-furyllithium are readily prepared by the action of n-butyllithium upon the corresponding substituted furan. In other words treatment of the appropriate 2-substituted-furan with n-butyllithium affords the desired 5-substituted-2-furyllithium. The preferred 2-substituted-furans to be used in this present invention are 2-alkylfurans; for example, 2-methylfuran, 2-ethylfuran, 2-propylfuran, 2-butylfuran and are commercially available or may be prepared by facile methods, such as described by H. Gilman and N. O. Calloway, J. Amer. Chem. Soc., 55, 4197 (1933); or 2-aryl- or 2-(substituted aryl)-furans; for example, 2-phenyl- and 2-p-chlorophenyl-furan, described by A. W. Johnson, J. Chem. Soc., 895 (1946).

The above furan derivatives of Formula III may be converted directly to the 2H-pyran-3(6H)-one derivatives of this invention of Formula I in which $R^1$ is a hydrogen, lower alkyl, aryl or substituted aryl, as defined above, $R^2$ is a hydroxyl and $R^3$ and $R^4$ are as defined above (this subclass of compounds of Formula I is represented by Formula IV, below), by treatment with an organic peracid, such as, for example, m-chloroperbenzoic acid, peracetic acid, perbenzoic acid, monoperphthalic acid, and p-nitroperbenzoic acid. m-Chloroperbenzoic acid and peracetic acid are especially suitable reagents for this purpose. The organic peracid utilized may range in amount from approximately 1.1 molar equivalent to 100 molar equivalents, per mole of starting material. Any practical solvent inert to the peracid may be employed. Aliphatic and cyclic ethers, such as, for example, diethyl ether, dioxan, or tetrahydrofuran; lower aliphatic ketones such as, for example, acetone or methyl ethyl ketone; aromatic hydrocarbons such as, for example, benzene, toluene, or xylene; lower aliphatic alcohols, such as, for example, methanol, ethanol, isopropanol, or t-butanol; lower aliphatic acids and their lower alkyl esters such as, for example, acetic acid, ethyl acetate, or butyl acetate; and halogenated hydrocarbons such as, for example, chloroform, methylene chloride, carbon tetrachloride, or ethylene dichloride, are all useful inert solvents. Chloroform and dichloromethane are preferred solvents for this reaction. The time of reaction may extend from 15 minutes to 60 hours, with the preferred range being from one-half to twenty-four hours. The temperature of the reaction mixture may range from —30 to 50° C., with a preferred range of 0 to 35° C.

It should be noted that the above process may also be used to prepare 2H-pyran-3(6H)-ones of Formula IV in which $R^3$ or both $R^3$ and $R^4$ are substituted lower alkyl radicals possessing an epoxide group as the substituent, by using an aliphatic aldehyde or ketone possessing an isolated double bond as starting material. For example, crotonaldehyde may be converted with 2-furyllithium to its corresponding furan derivative (III, $R^3$=H and $R^4$=CR$_3$CH=CH—), which on treatment with an organic peracid preferably, three to five molar equivalents, in the above described manner affords 6-hydroxy-2-(3-methyl-2-oxiranyl)-2H-pyran-3(6H)-one

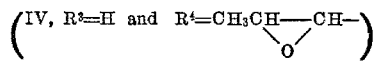

by simultaneous oxidation of the furyl ring and epoxidation of the isolated double bond.

Alternatively, the 2H-pyran-3(6H)-one of Formula I in which $R^1$ is a hydrogen, lower alkyl, aryl or substituted aryl, as defined above, $R^2$ is a hydroxyl group, and $R^3$ and $R^4$ are as defined above (compounds of Formula IV) may be obtained by treating the furan derivatives of Formula III with one to ten, preferably two to three, molar equivalents of a hypohalous acid such as, hypobromous or hypochlorous acid or a reagent capable of furnishing the elements of a hypohalous acid upon contact with water. Preferred reagents for this reaction are certain N-haloimides or N-haloamides, such as, N-bromo- or N-chlorosuccinimide, or N-chloro- or N-bromoacetamide. Water must be present and any inert organic solvent may be used. Preferred organic solvents include aliphatic and cyclic ethers, such as diethyl ether, dioxane, tetrahydrofuran, and lower aliphatic ketones, such as acetone. Aromatic hydrocarbons such as, for example, benzene, toluene, or xylene; lower aliphatic esters, such as, for example, the lower alkyl acetates, lower aliphatic halogenated lower aliphatic esters, such as, for example, the lower alkyl acetates, lower aliphatic carboxylic acids, such as, for example, acetic or butyric acid; lower aliphatic halogenated hydrocarbons such as, for example, chloroform, methylene chloride may also be used as solvents for the reaction. The reaction may be performed with or without the presence of a weak base such as, for example, sodium acetate or sodium bicarbonate. The time of reaction may extend from three minutes to twenty-four hours, and reaction conditions are preferably chosen so as to complete the reaction within one half hour. The temperature range at which the reactions may be carried out is from —20° to 50° C., with temperatures of about 0–20° C. being the preferred range.

Of special interest is the reaction of the above furan derivatives of Formula III with a N-haloimide or a N-haloamide, such as, for example, N-bromosuccinimide, N-chlorosuccinimide or N-bromoacetamide, when a primary lower alkanol is used as solvent for the reaction. In such a case these reactions may be carried out with or without the addition of water or in the presence or absence of a weak base, such as sodium acetate or sodium bicarbonate. Under these conditions the furan derivative is transformed into a dihydrofuran derivative of formula

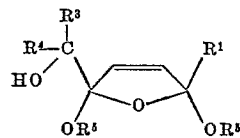

in which $R^1$, is hydrogen, lower alkyl, aryl or substituted aryl, as defined above, $R^3$ and $R^4$ are as defined above and $R^5$ is a straight chain lower alkyl which is derived from the primary lower alkanol used in the reaction. Preferred conditions for the reaction include the use of two to three molar equivalents of N-bromosuccinimide as reagent, methanol as solvent, a temperature range from −10° to 20° C. and a reaction time from ten minutes to two hours. The dihydrofuran derivative, thus obtained, may then be transformed facilely to the compounds of Formula I in which $R^1$ is hydrogen, lower alkyl, aryl or substituted aryl, as defined above, $R^2$ is a hydroxyl and $R^3$ and $R^4$ are as described above, by treatment with a mixture of a lower alkanoic acid, preferably acetic acid, and water, or by treatment with water in an inert solvent such as diethylether or tetrahydrofuran in the presence of small amounts of a strong organic acid such as, for example, p-toluenesulfonic acid.

Conversion of the 2H-pyran-3(6H)-one derivatives in which $R^1$ is hydrogen, obtained as described above, to the corresponding acylated derivatives, the compounds of this invention of Formula I in which $R^1$ is hydrogen and $R^2$ is an esterified hydroxyl group in which the ester-forming group is an aliphatic acid containing from 2 to 7 carbon atoms, a p-nitrobenzoic acid or chloroacetic acid, is achieved by treatment with an excess of the appropriate acid anhydride preferably in the presence of sodium acetate.

The above 2H-pyran-3(6H)-one derivatives of Formula I in which $R^2$ is a hydroxyl may be converted to their corresponding lower alkyl ether, lower alkoxy(lower) alkyl ether, benzyl ether or tetrahydropyranyl ether derivatives of Formula I in which $R^1$ is hydrogen, lower alkyl, aryl or substituted aryl and $R^2$ is a lower alkoxy, lower alkoxy(lower)alkoxy, benzyloxy or tetrahydropyranyloxy group, respectively. Conversion of the 2H-pyran-3(6H)-one derivatives to their lower alkoxy-(lower)alkyl ethers is effected by treatment with a lower alkoxy(lower)aliphatic ester, for example, 2-methoxyethyl acetate, in the presence of an acid catalyst, for example, perchloric acid. When $R^1$ is hydrogen, the alkyl ether derivatives are preferably prepared by treating the appropriate 2H-pyran-3(6H)-one derivative with a molar excess, preferably a threefold excess, of a lower alkyl halide, for example, iodomethane, iodoethane or 1-iodopropane, and silver oxide in an inert solvent such as, for example, acetone. When $R^1$ is lower alkyl, aryl or substituted aryl, the alkyl ethers are preferably prepared by treating the corresponding 2H-pyran-3(6H)-one derivative with an excess of the appropriate alkanol in the presence of an acid catalyst, for example, perchloric acid. The corresponding benzyl ethers are prepared by treating the corresponding 2H-pyran-3(6H)-one derivative with an excess of benzyl alcohol in the presence of an acid catalyst, for example, perchloric acid. The corresponding tetrahydropyranyl ethers are prepared by treating the appropriate 2H-pyran-3(6H)-one derivative with a molar excess of dihydropyran in benzene solution in the presence of an acid catalyst, such as, for example, p-toluenesulfonic acid.

The 2H-pyran-3(6H)-one derivatives of Formula IV in which $R^1$ is hydrogen may be oxidized by means of hexavalent chromium ion, for example, chromic acid in the presence of sulfuric acid and water, described above, to the corresponding keto-lactones which are the compounds of this invention of Formula I in which $R^1$ and $R^2$ together represent a ketonic oxygen, and $R^3$ and $R^4$ are as previously defined. This subclass of compounds of Formula I is represented by Formula V, below.

An interesting aspect of this invention relates to the physical properties of the above keto-lactones. More particularly, when one considers the structural features of the keto-lactones of Formula V in which $R^3$ is hydrogen and $R^4$ is an organic radical as defined above, it becomes apparent that a compound of this particular structure is capable of ketol-enol tautomerism, as illustrated by Formulae VI and VII. Indeed,

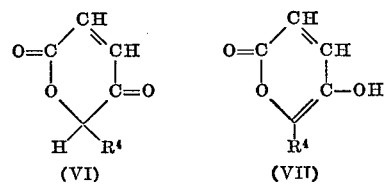

examination of the physical properties of these compounds, for instance, examination of their infrared and nuclear magnetic resonance spectra, reveal that the enolized form of Formula VII is the more stable tautomer and is, in many cases, the only form in which these compounds are isolated. Accordingly, these compounds are named with reference to their enol form in the examples of this invention given below.

Consequently, the above keto-lactones exhibiting keto-enol tautomerism may be treated with an appropriate aliphatic acid anhydride to yield the corresponding acylates of the enol (VII) in which the ester-forming group contains 2–7 carbon atoms. These enol acylates retain the pharmacologic properties of the compounds of this preferred embodiment and may be employed in the manner described for said compounds.

The following formulae in which $R^1$, $R^3$ and $R^4$ are as defined above, and examples will further illustrate this invention.

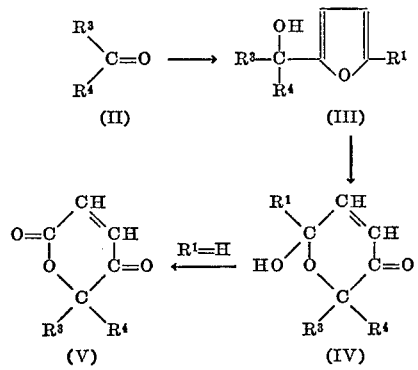

EXAMPLE 1

α-Methyl-α-phenylfurfuryl alcohol (III, $R^1$=H, $R^3$=CH$_3$ and $R^4$=phenyl)

A solution of furan (50 g.), ether (1000 ml.) and a 1.58 N ethereal solution of n-butyllithium (440 ml.) is stirred at room temperature for one hour. Then a solution of acetophenone (50 g.) in toluene (2000 ml.) is added and the mixture is stirred for 16 hours at room temperature. Water and ether are added and the organic phase is washed further with water, dried and evaporated, yielding α-methyl-α-phenylfurfuryl alcohol of sufficient purity for further use.

Part of the crude material may be distilled at 0.06 mm. (B.P. 83° C.) and then purified further by chromatography on basic alumina. The title compound is then eluted with benzene-hexane (1:2).

Analysis.—Calcd. for $C_{12}H_{12}O_2$ (percent): C, 76.57; H, 6.43. Found (percent): C, 76.30; H, 6.16.

The procedure of Example 1 may be followed to make other intermediate furan derivatives of Formula III in which $R^1$ is hydrogen. In each case an equivalent amount of starting material, ketone or aldehyde, which may be added to the reaction with or without an inert solvent, is used instead of acetophenone. Generally, the isolated product is of sufficient purity for further use and purification, for example, by crystallization or by distillation, is not critical. Examples of other furan derivatives in which $R^1$ is hydrogen are listed in Tables I, II and III. The intermediate furan derivatives given further purification are listed in Tables I and II with boiling point (B.P.) or melting point (M.P.). The notations for $R^3$ and $R^4$ have reference to Formula III above. (Furfuryl alcohol, included in Formula III of this invention, is not listed since it is commercially available).

TABLE I

| Example | Starting material | Furan product (Formula III with $R^1$=H) | | Physical constants |
|---|---|---|---|---|
| | | $R^3$ | $R^4$ | |
| 2 | Benzaldehyde | H |  | 3,350, 1,600 f |
| 3 | 4-isopropylbenzaldehyde | H | (CH₃)₂CH—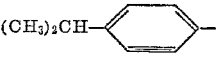 | 3,375 m |
| 4 | p-Chlorobenzaldehyde | H | Cl— | 3,450, 1,590 f |
| 5 | 4-(2-bromoethoxy)benzaldehyde | H | BrCH₂CH₂O—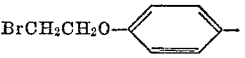 | 3,400, 1,600 f |
| 6 | 2,4-dichlorobenzaldehyde | H | 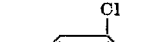 | 3,350, 1,585 f |
| 7 | p-Benzyloxybenzaldehyde | H |  | 3,350, 1,610 m |
| 8 | 3,4-dibenzyloxybenzaldehyde | H | 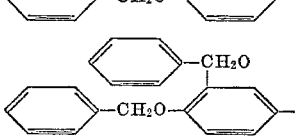 | 3,400, 1,600 f |
| 9 | 5-indanecarboxaldehyde | H | 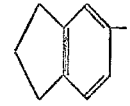 | 3,400, 1,500 f |
| 10 | 4-biphenylylcarboxaldehyde | H | 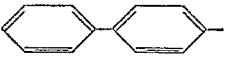 | 77–78 a |
| 11 | 9-anthraldehyde | H | 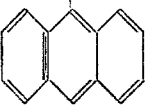 | 3,360, 1,615 m |
| 12 | 2-phenylpropionaldehyde | H | 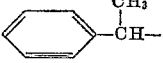 | 3,540, 3,400, 1,600 f |
| 13 | Benzylacetone | CH₃— | 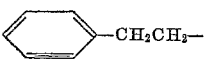 | 3,540, 3,480, 1,600 f |
| 14 | p-Phenylacetophenone | CH₃— | 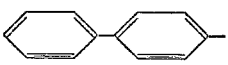 | 54–56 a |
| 15 | Cyclopropylphenylketone |  | 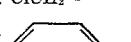 | 3,575, 3,400 o |
| 16 | α-Chloroacetophenone | ClCH₂— | Same as above | 3,525, 1,450 f |
| 17 | Benzophenone | 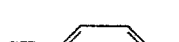 | do | 91.5–92 a |
| 18 | p-Methylbenzophenone | Same as above | CH₃—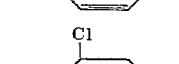 | 3,590, 3,400 o |
| 19 | 3,4-dimethylbenzophenone | do |  | 3,550, 3,450 f |
| 20 | 4-chlorobenzophenone | do | Cl— | 3,570, 3,400 o |
| 21 | 4,4′-dichlorobenzophenone | Cl— | Same as above | 3,575, 3,400 o |
| 22 | 4-methoxybenzophenone | 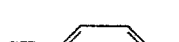 | CH₃O— | 3,575, 3,400 o |
| 23 | Benzoyl-p-biphenyl | Same as above | 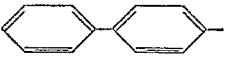 | 110–1 a |

TABLE I—Continued

| Example | Starting material | Furan product (Formula III with R¹=H) R³ | R⁴ | Physical constants |
|---|---|---|---|---|
| 24 | Deoxybenzoin | do | C₆H₅–CH₂– | 3,530, 3,420, 1,600 [f] |
| 25 | Benzoin | do | C₆H₅–CH(OH)– | 123–124 [a] |
| 26 | 3,4-dimethoxybenzaldehyde | H | 3,4-(CH₃O)₂C₆H₃– | 3,560 [f] |
| 27 | Diphenylacetaldehyde | H | (C₆H₅)₂CH– | 3,540, 1,600 [f] |
| 28 | Acetone | CH₃– | CH₃– | 7,274/15 [b] |
| 29 | p-(4-chlorophenyl)-acetophenone | CH₃– | 4-Cl-C₆H₄-C₆H₄– | 84–85 [a] |
| 30 | 3-hexanone | CH₃CH₂– | CH₃CH₂CH₂– | 3,530, 1,500 [f] |
| 31 | Crotonaldehyde | H | CH₃CH=CH– | 3,350, 1,495 [f] |
| 32 | 2-dibenzofurancarboxaldehyde | H | 2-dibenzofuranyl | 3,600, 1,500 [c] |
| 33 | Cyclohexanecarboxaldehyde | H | cyclohexyl | 3,540 [f] |
| 34 | 2-dibenzofuranylmethylketone | CH₃– | 2-dibenzofuranyl | 3,585, 3,460 [c] |
| 35 | p-Nitroacetophenone | CH₃– | O₂N–C₆H₄– | 3,600, 3,400 [c] |

[a] M.P. (° C.).
[b] B.P. (° C./mm.).
[c] Infrared spectrum maxima in cm.⁻¹ (chloroform).
[f] Infrared spectrum maxima in cm.⁻¹ (film).
[m] Infrared spectrum maxima in cm.⁻¹ (Nujol mull).

TABLE II

| Ex. | Starting material | Furan product | Physical constant [1] |
|---|---|---|---|
| 36 | Cyclohexanone | 1-(2'-furyl)cyclohexan-1-ol | 106–107/13 [b] |
| 37 | 9-fluorenone | 9-(2'-furyl)-fluoren-9-ol | 3,590, 3,400 [c] |
| 38 | 5H-dibenzo[a,d]cyclohepten-5-one | 5-(2'-furyl)-5H-dibenzo[a,d]-cyclohepten-5-ol | 166–168 [a] |
| 39 | 10,11-dihydro-5H-dibenzo[a,d]cyclohepten-5-one.[2] | 5-(2'-furyl)-10,11-dihydro-5H-dibenzo[a,d]-cyclohepten-5-ol | 129–130 [b] |
| 40 | 1,6,7,11b-tetrahydro-2H-dibenz[cd,h]-azulen-2-one.[3] | 2-(2'-furyl)-1,6,7,11b-tetrahydro-2H-dibenz[cd,h]azulen-2-ol | 3,590, 3,400 [c] |
| 41 | 2-chlorocyclohexanone | 2-chloro-1-(2'-furyl)cyclohexan-1-ol | 3,540, 1,500 [g] |
| 42 | Cyclopentanone | 1-(2'-furyl)cyclopentan-1-ol | 3,530, 1,500 [g] |

[1] For definition of superscripts in this column see footnotes to Table I.
[2] Described by S. O. Winthrop, et al., J. Org. Chem., 27, 230 (1962).
[3] Described by L. G. Humber, et al., J. Heterocyclic Chem., 3, 247 (1966).

TABLE III

| Example | Starting material | Furan product (Formula III with R¹=H) R³ | R⁴ |
|---|---|---|---|
| 43 | o-Ethylacetophenone | CH₃– | 2-C₂H₅-C₆H₄– |
| 44 | p-Fluorobenzaldehyde | H | 4-F-C₆H₄– |

TABLE III—Continued

| Example | Starting material | Furan product (Formula III with R¹=H) R³ | R⁴ |
|---|---|---|---|
| 45 | o-Iodobenzaldehyde | H | 2-iodophenyl |
| 46 | p-Hydroxyacetophenone | $CH_3-$ | 4-hydroxyphenyl (HO—C₆H₄—) |
| 47 | 4-ethoxyacetophenone | $CH_3-$ | 4-ethoxyphenyl ($C_2H_5O$—C₆H₄—) |
| 48 | 4-propoxyacetophenone | $CH_3-$ | 4-n-propoxyphenyl ($n$-$C_3H_7O$—C₆H₄—) |
| 49 | p-(4-hydroxyphenyl)acetophenone | $CH_3-$ | 4'-hydroxy-4-biphenylyl (HO—C₆H₄—C₆H₄—) |
| 50 | p-(4-methoxyphenyl)acetophenone | $CH_3-$ | 4'-methoxy-4-biphenylyl ($CH_3O$—C₆H₄—C₆H₄—) |
| 51 | p-(4-ethoxyphenyl)acetophenone | $CH_3-$ | 4'-ethoxy-4-biphenylyl ($C_2H_5O$—C₆H₄—C₆H₄—) |
| 52 | p-(4-propoxyphenyl)acetophenone | $CH_3-$ | 4'-n-propoxy-4-biphenylyl ($n$-$C_3H_7O$—C₆H₄—C₆H₄—) |
| 53 | (2,4-dichlorophenyl)phenylacetaldehyde | H | (2,4-dichlorophenyl)(phenyl)methyl— |
| 54 | 4,4'-dichlorodiphenylacetaldehyde | H | bis(4-chlorophenyl)methyl— |
| 55 | 4-biphenylyl-2-propanone | $CH_3-$ | 4-biphenylylmethyl— (C₆H₅—C₆H₄—CH₂—) |
| 56 | (4'-bromo-4-biphenylyl)-2-propanone | $CH_3-$ | (4'-bromo-4-biphenylyl)methyl— (Br—C₆H₄—C₆H₄—CH₂—) |
| 57 | (4'-chloro-4-biphenylyl)-2-propanone | $CH_3-$ | (4'-chloro-4-biphenylyl)methyl— (Cl—C₆H₄—C₆H₄—CH₂—) |
| 58 | 1,1-diphenyl-2-propanone | $CH_3-$ | diphenylmethyl— |
| 59 | p-(4-bromophenyl)acetophenone | $CH_3-$ | 4'-bromo-4-biphenylyl (Br—C₆H₄—C₆H₄—) |
| 60 | m-Nitroacetophenone | $CH_3-$ | 3-nitrophenyl ($NO_2$—C₆H₄—) |
| 61 | α-Chloro-p-phenyl-acetophenone | $ClCH_2-$ | 4-biphenylyl |
| 62 | p-Phenylpropiophenone | $C_2H_5-$ | Same as above. |
| 63 | p-(4-biphenylyl)acetophenone | $CH_3-$ | 4-(4-biphenylyl)phenyl— (terphenylyl) |
| 64 | p-Phenylbutyrophenone | $n$-$C_3H_7-$ | 4-biphenylyl |

EXAMPLE 65

α-(4-biphenylyl)-5-methylfurfuryl alcohol (III; $R^1$=$CH_3$, $R^3$=H and $R^4$=4-biphenylyl)

To a solution of the 2-substituted furan, 2-methylfuran (15 g.), in benzene-tetrahydrofuran (70:30–300 ml.), cooled to 5° C., commercial n-butyllithium in hexane (50 ml. 2.2 N) is added under nitrogen. The reaction mixture is stirred for 1 hr. at room temperature, then cooled to 5° C. and a solution of the aldehyde, 4-biphenylylcarboxaldehyde, (19.8 g.) in tetrahydrofuran is slowly added. The reaction mixture is stirred for 1 hr. at room temperature, then allowed to stand overnight under nitrogen. Water is added slowly. The organic layer is washed with water, dried over magnesium sulfate ($MgSO_4$) and evaporated under reduced pressure to give an oil. Trituration of the oil with hexane gives the title compound as an amorphous solid;

$\gamma_{max.}^{CHCl_3}$ 3600, 3450, 1600, 1563, 1485, 1008 cm.$^{-1}$

EXAMPLE 66

α-Diphenylmethyl-5-methylfurfuryl alcohol (III; $R^1$=$CH_3$, $R^3$=H and $R^4$=diphenylmethyl)

To a solution of 2-methylfuran (100 ml.) in ether (100 ml.), cooled to 5° C., n-butyllithium (300 ml. of 2.5 N ether solution) is added under nitrogen. The reaction mixture is stirred for 1 hr. at room temperature. Then it is cooled to 5° C., and a solution of the aldehyde, 2,2-diphenylacetaldehyde, (100 g.) in ether is slowly added. The reaction mixture is stirred for 1 hr. at room temperature, then allowed to stand overnight under nitrogen. Water is slowly added. The organic layer is washed with water, dried over $MgSO_4$ and evaporated under reduced pressure. The residue is crystallized from ether-hexane yielding the title compound; M.P. 77–78° C., $\gamma_{max.}^{CHCl_3}$ 3600, 1700, 1500, 1010 cm.$^{-1}$, $\lambda_{max.}^{EtOH}$ 219 m$\mu$ ($\epsilon$=19,800)

EXAMPLE 67

α-[(3,4-dichloro)diphenylmethyl]-5-methylfurfuryl alcohol (III; $R^1$=$CH_3$, $R^3$=H and $R^4$=3,4-dichlorodiphenylmethyl)

To a solution of 2-methylfuran (20 g.) in ether-tetrahydrofuran (300:100 ml.), cooled to 5° C., n-butyllithium (65 ml.) (commercial-22% in hexane) is added under nitrogen. The solution is stirred at room temperature for 1 hr. Then it is cooled to 5° C. and a solution of crude aldehyde, (3,4-dichlorophenyl)phenylacetaldehyde, see below, in ether (100 ml.) is slowly added. The reaction mixture is stirred for one hour at room temperature then allowed to stand overnight under nitrogen. Water is slowly added. The organic layer is washed with water, dried over $MgSO_4$ and evaporated under reduced pressure yielding the title compound as an oil;

$\gamma_{max.}^{CHCl_3}$ 3595, 1027, and 698 cm.$^{-1}$

The (3,4-dichlorophenyl)phenylacetaldehyde used in this example may be prepared by the following two-step process:

(A) 1-(3,4-dichlorophenyl) - 1,2 - epoxy-1-phenylethane: A solution of methyl sulfinyl carbanion is prepared from sodium hydride (11 g., 50–55% suspension in mineral oil) and dry dimethyl sulfoxide (380 ml.). The solution is cooled to room temperature, diluted with equal amounts of dry tetrahydrofuran and then cooled to 0° C. with an ice-methanol bath. While stirring, a solution of trimethyl sulfonium iodide in dimethyl sulfoxide is added in such a rate that the temperature is maintained at 0–5° C. After stirring for a minute 3,4-dichlorophenyl phenyl ketone (21.5 g.), described by G. M. Kraay, Rec. trav. chem., 49, 1085 (1930), dissolved in tetrahydrofuran, is added at such a rate that the temperature is maintained at 5° C. Stirring is continued in methanol-ice bath for several minutes and then for about 45 minutes at room temperature. The reaction mixture is diluted with three volumes of water containing some salt and the product extracted with ether, washed with water, dried and evaporated to dryness to yield 1-(3,4-dichlorophenyl)-1,2-epoxy-1-phenylethane, NMR (CDCl$_3$) δ 3.11 and 3.27 (doublet, J.=5.5, 2H), 7.30 (multiplet, 8H), suitable for the next step (B).

(B) (3,4-dichlorophenyl)phenylacetaldehyde: To a cold solution (ice bath) of 1-(3,4-dichlorophenyl)-1,2-epoxy-1-phenylethane, described above, in anhydrous ether (250 ml.), boron trifluoride etherate (5 ml.) is added. After the removal of the bath the mixture is stirred for one hour at room temperature, then washed with saturated bicarbonate solution and then water containing some salt, dried and evaporated yielding 3,4-dichlorophenylacetaldehyde, $\gamma_{max.}^{CHCl_3}$ 1725 cm.$^{-1}$

EXAMPLE 68

α-(Diphenylmethyl)-5-phenylfurfuryl alcohol (III; $R^1$=phenyl, $R^3$=H and $R^4$=diphenylmethyl)

To a solution of the 2-substituted furan, 2-phenylfuran (7 g.), in ether (300 ml.), cooled to 5° C., n-butyllithium (26 ml., 22% in hexane) is added under nitrogen. The reaction mxture is stirred at room temperature for 1 hr. Then it is cooled and a solution of the aldehyde, diphenylacetaldehyde, (10 g.) in ether, is slowly added. The reaction mixture is stirred for 3–4 hrs. at room temperature. Water is slowly added. The organic layer is washed with water, dried over $MgSO_4$ and evaporated under reduced pressure yielding an oil. The oil is subjected to chromatography on silica gel. Elution with hexane and then ether gives the title compound as an oil;

$\gamma_{max.}^{CHCl_3}$ 3590, 1016 cm.$^{-1}$, $\lambda_{max.}^{EtOH}$ 218 m$\mu$ ($\epsilon$=19,400) and 287 m$\mu$ ($\epsilon$=23,000)

EXAMPLE 69

α-(Diphenylmethyl) - 5 - p-chlorophenylfurfuryl alcohol (III, $R^1$=p-chlorophenyl, $R^3$=H and $R^4$=diphenylmethyl)

To a solution of the 2-substituted furan, 2-p-chlorophenylfuran (35.6 g.), in ether (500 ml.) cooled to 5° C., n-butyllithium (100 ml., 22% in hexane) is added under nitrogen. The reaction mixture is stirred at room temperature for 1 hr. Then it is cooled and a solution of the aldehyde, diphenylacetaldehyde, (38 g.) is slowly added. The reaction mixture is stirred at room temperature for 3 hours. Water is slowly added. The organic layer is washed with water, dried over $MgSO_4$ and evaporated under reduced pressure yielding an oil. The oil is subjected to chromatography on silica gel. Elution with hexane and then ether affords the title compound as an oil;

$\gamma_{max.}^{CHCl_3}$ 3580, 3450, 1590, 1489, 1477, 1087, 1010 cm.$^{-1}$

NMR (CDCl$_3$), δ 7.30 (m., 4H), 6.35 (d., J=3.5 Hz., 1H), 6.07 (d., J=3.5 Hz., 1H), 5.38 (d., J=8.5 Hz., 1H), 4.48 (d., J=8.5 Hz., 1H), 2.28 (s., 1H).

The procedure of Examples 65 to 69 may be followed to make other intermediate furan derivatives of Formula III in which $R^1$ is lower alkyl, aryl or substituted aryl. In each case the appropriate ketone or aldehyde and appropriate 2-substituted furan are used as starting materials in an amount equivalent to the amounts of ketone or aldehydes and 2-substituted furans used in Examples 65 to 69. Examples of such other intermediate furan derivatives are listed in Table IV. The isolated products are sufficiently pure for further use.

TABLE IV

| Example | Starting materials | Furan product (Formula III) R¹ | R³ | R⁴ |
|---|---|---|---|---|
| 70 | Benzaldehyde and 2-methylfuran | $CH_3-$ | H | phenyl |
| 71 | Benzaldehyde and 2-propylfuran | $n\text{-}C_3H_7-$ | H | Same as above. |
| 72 | 4-biphenylylcarboxaldehyde and 2-methylfuran | $CH_3-$ | H | biphenyl |
| 73 | Diphenylacetaldehyde and 2-ethylfuran | $C_2H_5-$ | H | diphenylmethyl (Ph₂CH–) |
| 74 | Diphenylacetaldehyde and 2-butylfuran | $n\text{-}C_4H_9-$ | H | Same as above. |
| 75 | (3,4-dichlorophenyl)-phenylacetaldehyde and 2-p-chlorophenylfuran | p-Cl-C₆H₄– | H | (3,4-dichlorophenyl)(phenyl)CH– |
| 76 | p-Phenylacetophenone and 2-ethylfuran | $C_2H_5-$ | $CH_3-$ | biphenyl |
| 77 | p-Phenylacetophenone and 2-butylphenone | $n\text{-}C_4H_9-$ | $CH_3-$ | Same as above. |
| 78 | 1,1-diphenyl-2-propanone and 2-methylfuran | $CH_3-$ | $CH_3-$ | diphenylmethyl |
| 79 | Deoxybenzoin and 2-phenyl furan | phenyl | phenyl | benzyl (–CH₂Ph) |
| 80 | Benzoyl-p-biphenyl and 2-methylfuran | $CH_3-$ | Same as above. | biphenyl |

EXAMPLE 81

6-hydroxy-2-methyl-2-phenyl-2H-pyran-3(6H)-one (IV- R¹=H, R³=CH₃ and R⁴=phenyl)

A solution of m-chloroperbenzoic acid (38.6 g.) in chloroform (880 ml.) is added dropwise to a solution of α-methyl-α-phenylfurfuryl alcohol (31.4 g.; III, R¹=H, R³=CH₃, R⁴=phenyl), described in Example 1, in chloroform (375 ml.). The solution is stirred for three hours. The solution is washed with sodium bicarbonate and water, dried and evaporated. The residue is crystallized from hexane yielding the title compound; M.P. 63–66° C. This product is sufficiently pure for further use. A portion of the product is purified by chromatography on silica gel. The fractions eluted with 10% ethyl acetate in benzene are recrystallized from acetone-hexane to afford the pure title compound; M.P. 81–82.5° C.

*Analysis.*—Calcd. for $C_{12}H_{12}O_3$ (percent): C, 70.58; H, 5.92. Found (percent): C, 70.99; H, 6.07.

In the same manner but using an equivalent amount of peracetic acid, perbenzoic acid, monoperphthalic acid or p-nitroperbenzoic acid instead of m-perchlorobenzoic acid, the title compound is also obtained.

EXAMPLE 82

2-(diphenylmethyl)-6-hydroxy-2H-pyran-3(6H)-one (IV, R¹ and R³=H and R⁴=diphenylmethyl)

A solution of α-(diphenylmethyl) furfuryl alcohol (316.8 g.), (III; R¹ and R³=H, R⁴=diphenylmethyl), described in Example 27, chloroform (4 l.) is cooled to 5° C. and 40% peracetic acid (450 ml.) is added slowly, the temperature being kept below 10° C. When the addition is complete the mixture is stirred at 20° C. for 3 hrs. The mixture is cooled again and washed with water, sodium bicarbonate solution, potassium iodide solution and sodium thiosulfate solution. The chloroform solution is then concentrated to one third its volume. Addition of hexane precipitates the title compound as a solid, M.P. 159–160° C., $\gamma_{max.}^{mull}$ 3320, 3070, 1670, 1595 cm.⁻¹

In the same manner but using an equivalent amount of m-chloroperbenzoic acid, perbenzoic acid, monoperphthalic acid or p-nitrobenzoic acid instead of peracetic acid, the title compound is also obtained.

EXAMPLE 83

2-(4-biphenylyl)-6-hydroxy-2-methyl-2H-pyran-3(6H)-one (IV, R¹=H, R³=CH₃ and R⁴=biphenyl)

A solution in methanol (600 ml.) of α-methyl-α-(4-biphenylyl)furfuryl alcohol (4.8 g., 0.018 m.), prepared as described in Example 14, is cooled to 10° C., and sodium acetate (6.0 g. 0.07 m.) and N-bromosuccinimide (8.0 g. 0.045 m.) are added. The mixture is stirred at 10° C. for 20 minutes and poured in a saturated solution of sodium bicarbonate (300 ml.). Ether is added and the organic phase is washed and dried. Evaporation gives α-(4-biphenylyl)-α-methyl-2,5-dihydro - 2,5 - dimethoxyfurfuryl alcohol as a yellow oil $(\gamma_{CHCl_3}^{max.}=3580, 2840, 1630$ cm.⁻¹)

This oil is dissolved in acetice acid and water is added slowly. The crude compound is filtered and recrystallized from acetone by addition of hexane to give 4.0 g. of the title compound, M.P. 166° C.

The title compound is obtained also by treatment of the yellow oil mentioned above with p-toluenesulfonic acid in moist ether.

Using the procedure of Example 83 but using aqueous tetrahydrofuran instead of methanol as solvent, yields directly the title compound of Example 83 without subsequent treatment with an acid such as acetic acid or p-toluenesulfonic acid.

The procedure of Examples 81, 82 and 83 may be followed to prepare the 6-hydroxy-2H-pyran-3(6H)-one derivatives of Formula IV, in which $R^1$ is as defined in the first instance, a sub-class of the compounds of this invention. Examples of other 6-hydroxy-2H-pyran-3(6H)-one derivatives prepared by any of these procedures are listed in Tables V, VI and VII as Examples 84–150. In each case an equivalent amount of intermediate furan derivative of Formula III, see for instance Examples 2 to 80, is used instead of α-methyl-α-furfuryl alcohol or α-methyl-α-(4-biphenylyl)-furfuryl alcohol, respectively.

In cases where this procedure of Example 83 is followed, note that intermediates of formula

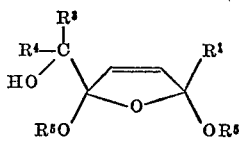

in which $R^1$ is hydrogen, lower alkyl, aryl or substituted aryl, as defined above, and $R^3$, $R^4$ and $R^5$ are as defined in the first instance, may be isolated. For example, α,α-diphenylfurfuryl alcohol, described in Example 17 and used in Example 84, is transformed to the intermediate, α,α-diphenyl-2,5-dihydro-2,5-dimethoxyfurfuryl alcohol; 9-(2'-furyl)fluoren-9-ol; described in Example 37 and used in Example 133, is transformed to the intermediate, 9-(2',5'-dihydro-2',5'-dimethoxy-2'-furyl)-fluoren-9-ol; and 5-(2'-furyl)-10-11-dihydro-5H-dibenzo[a,d]cyclohepten-5-ol, described in Example 39 and used in Example 135, is transformed into the intermediate, 5-(2',5'-dihydro-2',5'-dimethoxy-2'-furyl)-10,11-dihydro-5H-dibenzo[a,d]cyclohepten-5-ol.

The notations used in Tables V, VI and VII for $R^3$ and $R^4$ have reference to Formula I above.

TABLE V

| Example | Furan intermediate (Formula III with $R^1$=H) $R^3$ | $R^4$ | 6-hydroxy-2H-pyran-3(6H)-one product (Formula IV) | Physical constants[1] |
|---|---|---|---|---|
| 84 | | phenyl, phenyl | 2,2-diphenyl-6-hydroxy-2H-pyran-3(6H)-one | 93–95 a |
| 85 | H | H | 6-hydroxy-2H-pyran-3(6H)-one | 58–59 a |
| 86 | H | phenyl | 6-hydroxy-2-phenyl-2H-pyran-3(6H)-one | 74–75 a |
| 87 | H | $(CH_3)_2CH$–phenyl | 2-(4-isopropylphenyl)-6-hydroxy-2H-pyran-3(6H)-one | 60–61 a |
| 88 | H | Cl–phenyl | 2-(p-chlorophenyl)-6-hydroxy-2H-pyran-3(6H)-one | 93–95 a |
| 89 | H | $BrCH_2CH_2O$–phenyl | 2-[4-(2-bromoethoxy)phenyl]-6-hydroxy-2H-pyran-3(6H)-one | 92–93 a |
| 90 | H | 2,4-dichlorophenyl | 2-(2,4-dichlorophenyl)-6-hydroxy-2H-pyran-3(6H)-one | 146–147 a |
| 91 | H | phenyl–$CH_2O$–phenyl | 2-(p-benzyloxyphenyl)-6-hydroxy-2H-pyran-3(6H)-one | 92–94 a |
| 92 | H | 3,4-bis(benzyloxy)phenyl | 2(3,4-dibenzyloxyphenyl)-6-hydroxy-2H-pyran-3(6H)-one | 96–98 a |
| 93 | H | indanyl | 6-hydroxy-2-(5-indanyl)-2H-pyran-3(6H)-one | 89–90 a |
| 94 | H | biphenylyl | 2-(4-biphenylyl)-6-hydroxy-2H-pyran-3(6H)-one | 124–126 a |
| 95 | H | 9-anthryl | 2-(9-anthryl)-6-hydroxy-2H-pyran-3(6H)-one | 90–92 a |
| 96 | H | phenyl–CH($CH_3$)– | 6-hydroxy-2-(α-methylbenzyl)-2H-pyran-3(6H)-one | 84–85 a |
| 97 | $CH_3$– | phenyl–$CH_2CH_2$– | 6-hydroxy-2-methyl-2-phenethyl-2H-pyran-3(6H)-one | 3,600, 1,688 c |
| 98 | cyclopropyl | phenyl | 2-cyclopropyl-6-hydroxy-2-phenyl-2H-pyran-3(6H)-one | 82–83, 5 a |

TABLE V—Continued

| Example | Furan intermediate (Formula III with R¹=H) R³ | R⁴ | 6-hydroxy-2H-pyran-3(6H)-one product (Formula IV) | Physical constants[1] |
|---|---|---|---|---|
| 99 | ClCH₂ | Same as above | 2-(chloromethyl)-6-hydroxy-2-phenyl-2H-pyran-3(6H)-one | 121–122 [a] |
| 100 |  | 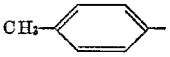 | 6-hydroxy-2-phenyl-2-(p-tolyl)-2H-pyran-3(6H)-one | 3,550, 1,685 [c] |
| 101 | Same as above | 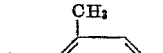 | 6-hydroxy-2-phenyl-2-(3,4-xylyl)-2H-pyran-3(6H)-one | 158–160 [a] |
| 102 | do |  | 2-(p-chlorophenyl)-6-hydroxy-2-phenyl-2H-pyran-3(6H)-one | 3,550, 1,685 [c] |
| 103 | 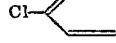 | Same as above | 2,2-di(4-chlorophenyl)-6-hydroxy-2H-pyran-3(6H)-one | 46–48 [a] |
| 104 |  | 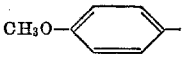 | 6-hydroxy-2-(4-methoxyphenyl)-2-phenyl-2H-pyran-3(6H)-one. | 3,550, 1,685 [c] |
| 105 | Same as above | 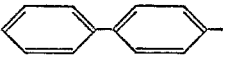 | 2-(4-biphenylyl)-6-hydroxy-2-phenyl-2H-pyran-3(6H)-one | 137–138 [a] |
| 106 | do | 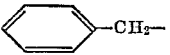 | 2-benzyl-6-hydroxy-2-phenyl-2H-pyran-3(6H)-one | 112–114 [a] |
| 107 | do | 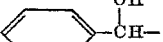 | 6-hydroxy-2-(α-hydroxybenzyl)-2-phenyl-2H-pyran-3(6H)-one. | 130–132 [a] |
| 108 | H | 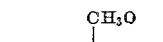 | 6-hydroxy-2-(4,3-dimethoxyphenyl)-2H-pyran-3(6H)-one | 112 [a] |
| 109 | CH₃— | CH₃— | 2,2-dimethyl-6-hydroxy-2H-pyran-3(6H)-one | 68–70/0.02 [b] |
| 110 | CH₃— | 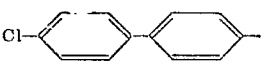 | 2-[4'-chloro(4-biphenylyl)]-6-hydroxy-2-methyl-2H-pyran-3(6H)-one. | 159–160 [a] |
| 111 | CH₃CH₂— | CH₃CH₂CH₂— | 2-ethyl-6-hydroxy-2-propyl-2H-pyran-3(6H)-one | 1,694, 1,630 [c] |
| 112 | H | CH₃CH—CH—CH— (O) | 6-hydroxy-2-(3-methyl-2-oxiranyl)-2H-pyran-3(6H)-one | 1,696, 1,630 [c] |
| 113 | H | 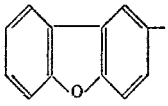 | 2-(2-dibenzofuryl)-6-hydroxy-2H-pyran-3(6H)-one | 117–8 [a] |
| 114[2] | H | 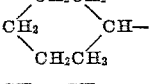 | 2-cyclohexyl-6-hydroxy-2H-pyran-3(6H)-one | 3,550, 1,685 [c] |
| 115 | CH₃— | 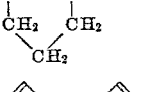 | 2-cyclopentyl-6-hydroxy-2-methyl-2H-pyran-3(6H)-one | 3,550, 1,685 [a] |
| 116 | CH₃— | 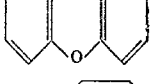 | 2-(2-dibenzofuryl)-6-hydroxy-2-methyl-2H-pyran-3(6H)-one | 139–140 [a] |
| 117 | CH₃— |  | 6-hydroxy-2-methyl-2-(p-nitrophenyl)-2H-pyran-3(6H)-one | 130–131 [a] |
| 118 | CH₃— | 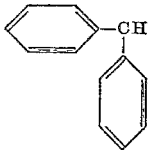 | 2-diphenylmethyl-6-hydroxy-2-methyl-2H-pyran-3(6H)-one. | 141–2 [a] |
| 119 | CH₃— | 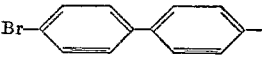 | 2-[4'-bromo(4-biphenylyl)]-6-hydroxy-2-methyl-2H-pyran-3(6H)-one. | 155–156 [a] |
| 120 | CH₃ | 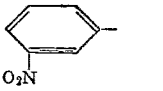 | 6-hydroxy-2-methyl-2-(m-nitrophenyl)-2H-pyran-3(6H)-one | 109.5–111 [a] |

TABLE V—Continued

| Example | Furan intermediate (Formula III with R¹=H) R³ | R⁴ | 6-hydroxy-2H-pyran-3(6H)-one product (Formula IV) | Physical constants [1] |
|---|---|---|---|---|
| 121 | ClCH₂— | (4-biphenylyl) | 2-(4-biphenylyl)-2-chloromethyl-6-hydroxy-2H-pyran-3(6H)-one. | 187–188 a |
| 122 | C₂H₅— | Same as above | 2-(4-biphenylyl)-2-ethyl-6-hydroxy-2H-pyran-3(6H)-one. | 159–160 a |
| 123 | CH₃— | (p-terphenyl-4-yl) | 6-hydroxy-2-methyl-2-(p-terphenyl-4-yl)-2H-pyran-3(6H)-one. | 211–212 a |
| 124 | n-C₃H₇— | (4-biphenylyl) | 2-(4-biphenylyl)-2-propyl-6-hydroxy-2H-pyran-3(6H)-one. | 146–147 a |
| 125 | CH₃ | HO-(4-biphenylyl) | 6-hydroxy-2-[4'-hydroxy-(4-biphenylyl)]-2-methyl-2H-pyran-3(6H)-one. | 3,300, 1,690 p |
| 126 | CH₃ | CH₃O-(4-biphenylyl) | 6-hydroxy-2-[4'-methoxy-(4-biphenylyl)]-2-methyl-2H-pyran-3(6H)-one. | 198–199 a |
| 127 | H | (2,4-dichlorodiphenylmethyl) | 2-[(2,4-dichloro)diphenylmethyl]-6-hydroxy-2H-pyran-3(6H)-one. | 3,350, 3,380 o |
| 128 | H | (4,4'-dichlorodiphenylmethyl) | 2-[(4,4'-dichloro)diphenylmethyl]-6-hydroxy-2H-pyran-3(6H)-one. | 3,355, 3,380 o |
| 129 | CH₃ | (4-biphenylmethyl) | 2-(4-biphenylmethyl)-6-hydroxy-2-methyl-2H-pyran-3(6H)-one. | 115–116 a |
| 130 | CH₃ | Br-(4-biphenylylmethyl) | 2-[4'-bromo-(4-biphenylylmethyl)]-6-hydroxy-2-methyl-2H-pyran-3(6H)-one. | 3,440, 1,683 m |
| 131 | CH₃ | Cl-(4-biphenylylmethyl) | 2-[4'-chloro-(4-biphenylylmethyl)]-6-hydroxy-2-methyl-2H-pyran-3(6H)-one. | 3,580, 3,400 o |

[1] For definition of the superscripts in this column see the footnotes to Table I.
[2] Procedure of Example 83 used only.

Other examples of 6-hydroxy-2H-pyran-3(6H)-one derivatives of Formula IV within the scope of this invention include those in which R³ or R⁴ are phenyl with mixed substitution. Such examples include 2-(2-bromo-4-hydroxyphenyl)-6-hydroxy-2H-pyran-3(6H)-one,
6-hydroxy-2-(4-hydroxy-3-methoxyphenyl)-2H-pyran-3(6H)-one,
6-hydroxy-2-(2-hydroxy-3-methoxyphenyl)-2-methyl-2H-pyran-3(6H)-one and
6-hydroxy 2-(4-methoxy-3-nitrophenyl)-2-methyl-2H-methyl-2H-pyran-3(6H)-one, which may be prepared via their respective furan intermediate of Formula III from the respective starting materials of Formula II, 2-bromo-4-hydroxybenzaldehyde,
4-hydroxy-3-methoxybenzaldehyde,
2-hydroxy-3-methoxyacetophenone and
4-methoxy-3-nitroacetophenone.

TABLE VI

| Ex. | Furan intermediate (Formula III with R¹=H) | 6-hydroxy-2H-pyran-3(6H)-one product (Formula IV) | Physical constants [1] |
|---|---|---|---|
| 132 | 1-(2'-furyl)cyclohexan-1-ol. | 2-hydroxy-1-oxaspiro[5.5]undec-3-en-5-one. | 115–118/0.07 o |
| 133 | 9-(2'-furyl)-fluoren-9-ol | 6'-hydroxyspiro[fluorene-9, 2'-2'H-pyran]-3'(6'H)-one. | 3,550, 1,685 e |
| 134 | 5-(2'-furyl)-5H-dibenzo[a,d]-cyclohepten-5-ol. | 6'hydroxyspiro[5H-dibenzo-[a, d]-cyclo-heptene-5, 2'-2'H-pyran]-3'(6'H)-one. | 3,550, 1,685 e |
| 135 | 5-(2'-furyl)-19,11-dihydro-5H-dibenzo[a, d]cyclohepten-5-ol. | 10,11-dihydro-6'-hydroxyspiro-[5H-dibenzo[a, d]cyclo-heptene-5, 2'-2'H-pyran]-3'(6'H)one. | 143.5–144.5 a |
| 136 | 2-(2'-furyl)-1,6,7,11b-tetrahydro-2H-dibenz[cd, h]azulen-2-ol. | 6'-hydroxyspiro[1, 6, 7, 11b-tetrahydro-2H-dibenz[cd, h]-azulene-2, 2'-2'H-pyran]-3'-(6'H)-one. | 182–183 a |
| 137 | 2-chloro-1-(2'-furyl)cyclohexan-1-ol. | 7-chloro-2-hydroxy-1-oxospiro[5.5]undec-3-en-5-one. | 3,600, 3,500 o |
| 138 | 1-(2'-furyl)cyclopentan-1-ol. | 2-hydroxy-1-oxaspiro[4.5]dec-3-en-5-one. | 3,560, 1,685 o |

[1] For definitions of the superscripts in this column see the footnotes to Table I.

TABLE VII

| Ex. | Furan intermediate (Formula III) R¹ | R³ | R⁴ | 6-hydroxy-2H-pyran-3(6H)-one product (Formula IV) | Physical constants |
|---|---|---|---|---|---|
| 139 | $CH_3$— | H | 4-biphenylyl | 2-(4-biphenylyl)-6-hydroxy-6-methyl-2H-pyran-3(6H)-one | 110–111 a |
| 140 | $CH_3$— | H | diphenylmethyl (—CH(C₆H₅)₂) | 2-diphenylmethyl-6-hydroxy-6-methyl-2H-pyran-3(6H)-one | 155–156 a |
| 141 | $CH_3$— | H | (3,4-dichlorophenyl)-phenylmethyl | 2-[(3,4-dichloro)-diphenylmethyl]-6-hydroxy-6-methyl-2H-pyran-3(6H)-one. | 165.5–167 a |
| 142 | phenyl | H | diphenylmethyl | 2-(diphenylmethyl)-6-hydroxy-6-phenyl-2H-pyran-3(6H)-one | 135–136 a |
| 143 | 4-chlorophenyl | H | Same as above | 6-(p-chlorophenyl)-2-(diphenylmethyl)-6-hydroxy-2H-pyran-3(6H)-one. | 133–134 a |
| 144 | $C_2H_5$— | H | do | 2-diphenylmethyl-6-ethyl-6-hydroxy-2H-pyran-3(6H)-one | 106–107 a |
| 145 | n-$C_4H_9$— | H | do | 6-butyl-2-(diphenylmethyl)-6-hydroxy-2H-pyran-3(6H)-one | 113–114 a |
| 146 | $C_2H_5$— | $CH_3$— | 4-biphenylyl | 2-(4-biphenylyl)-6-ethyl-6-hydroxy-2-methyl-2H-pyran-3(6H)-one. | 90–92 a |
| 147 | n-$C_4H_9$— | $CH_3$— | Same as above | 2-(4-biphenylyl)-6-butyl-6-hydroxy-2-methyl-2H-pyran-3(6H)-one. | 99–100 a |
| 148 | $CH_3$— | $CH_3$— | diphenylmethyl | 2-(diphenylmethyl)-6-hydroxy-2,6-dimethyl-2H-pyran-3(6H)-one. | 125–126 a |
| 149 | $CH_3$— | | p-terphenyl-4-yl | 2-(4-biphenylyl)-6-hydroxy-6-methyl-2-phenyl-2H-pyran-3(6H)-one. | 149–150 a | a M.P. (° C.).

EXAMPLE 150

In the same manner as described for Examples 81, 82 and 83 but using the intermediate furan derivatives of Formula III described in Examples 43–48, 51, 52, 70, 71, 75, and 79, the following 6-hydroxy-2H-pyran-3(6H)-one derivatives of Formula IV, a subclass of the compounds of this invention, are obtained respectively:

2-(o-ethylphenyl)-6-hydroxy-2-methyl-2H-pyran-3(6H)-one,
2-(p-fluorophenyl)-6-hydroxy-2H-pyran-3(6H)-one,
2-(o-iodophenyl)-6-hydroxy-2H-pyran-3(6H)-one,
6-hydroxy-2-(p-hydroxyphenyl)-2-methyl-2H-pyran 3(6H)-one,
2-(4-ethoxyphenyl)-6-hydroxy-2-methyl-2H-pyran-3(6H)-one,
2-(4-propoxyphenyl)-6-hydroxy-2-methyl-2H-pyran-3(6H)-one,
2-[4'-ethoxy(4-biphenylyl)]-6-hydroxy-2-methyl-2H-pyran-3(6H)-one,
6-hydroxy-2-methyl-2-[4'-propoxy(4-biphenylyl)]-2H-pyran-3(6H)-one,
6-hydroxy-6-methyl-2-phenyl-2H-pyran-3(6H)-one,
6-hydroxy-2-phenyl-6-propyl-2H-pyran-3(6H)-one,
6-(p-chlorophenyl)-2-[(3,4-dichloro)diphenylmethyl]-6-hydroxy-2H-pyran-3(6H)-one, and 2-benzyl-2,6-diphenyl-6-hydroxy-2H-pyran-3(6H)-one.

EXAMPLE 151

2 - (4 - biphenylyl)-6-hydroxy-2-phenyl-2H-pyran-3(6H)-one acetate (I: R¹=H, R²=OCOCH₃, R³=phenyl and R⁴=4-biphenylyl)

A solution in benzene (200 ml.) of 2-(4-biphenylyl)-6 - hydroxy - 2-phenyl-2H-pyran-3(6H)-one (6.8 g.), described in Example 105, sodium acetate (5.0 g.) and acetic anhydride (26 ml.) is heated to reflux for 30 minutes. The mixture is washed, stirred for 30 minutes with a solution of NaHCO₃, washed again, dried over MgSO₄ and taken to dryness. The solid is crystallized from ether or dichloromethne by addition of hexane to give the title compound; M.P. 204–205° C.

The procedure of Example 151 may be followed to make other acylated derivatives of Formula I in which R¹ is hydrogen and R² is an esterified hydroxyl group in which the ester-forming group is an aliphatic acid containing from 2–7 carbon atoms, p-nitrobenzoic or chloracetic acid. In each case the amounts of the appropriate 6-hydroxy-2H-pyran-3(6H)-one derivative of Formula IV, for instance those prepared in Examples 81–138, and the acyl anhydride are equivalent to the amounts of 2-(4-biphenylyl) - 6-hydroxy-2-phenyl-2H-pyran-3(6H)-one and acetic anhydride used in Example 151. Examples of other acylated derivatives prepared in this manner as listed in Table VIII.

TABLE VIII

| Example | Number of example which describes corresponding 6-hydroxy-2H-pyran-3(6H)-one | Acylated derivative of Formula I in which $R^2$ is an esterified hydroxyl group | Physical constant [1] |
|---|---|---|---|
| 152 | 86 | 6-hydroxy-2-phenyl-2H-pyran-3(6H)-one acetate | 64–65 [a] |
| 153 | 91 | 2-(p-benzyloxyphenyl)-6-hydroxy-2H-pyran-3(6H)-one acetate | 118–119 [a] |
| 154 | 94 | 2-(4-biphenylyl)-6-hydroxy-2H-pyran-3(6H)-one acetate | 129–130 [a] |
| 155 | 94 | 2-(4-biphenylyl)-6-hydroxy-2H-pyran-3(6H)-one butyrate | 73–74 [a] |
| 156 | 94 | 2-(4-biphenylyl)-6-hydroxy-2H-pyran-3(6H)-one heptanoate | 1,745, 1,700 [c] |
| 157 | 94 | 2-(4-biphenylyl)-6-hydroxy-2H-pyran-3(6H)-one chloroacetate | 69–71 [a] |
| 158 | 101 | 6-hydroxy-2-phenyl-2-(3,4-xylyl)-2H-pyran-3(6H)-one acetate | 1,750, 1,690 [c] |
| 159 | 101 | 6-hydroxy-2-phenyl-2-(3,4-xylyl)-2H-pyran-3(6H)-one heptanoate | 1,750, 1,691 [c] |
| 160 | 107 | 6-hydroxy-2-(α-hydroxybenzyl)-2-phenyl-2H-pyran-3(6H)-one acetate. | 114–115 [a] |
| 161 | 110 | 2-[(4'-chloro-(4-biphenylyl)]-6-hydroxy-2-methyl-2H-pyran-3(6H)-one acetate. | 80–81 [a] |
| 162 | 83 | 2-(4-biphenylyl)-6-hydroxy-2-methyl-2H-pyran-3(6H)-one acetate | 89–90 [a] |
| 163 | 83 | 2-(4-biphenylyl)-6-hydroxy-2-methyl-2H-pyran-3(6H)-one p-nitrobenzoate. | 130–131 [a] |
| 164 | 123 | 6-hydroxy-2-methyl-2-(p-terphenyl-4-yl)-2H-pyran-3(6H)-one acetate. | 129–130 [a] |
| 165 | 121 | 2-(4-biphenylyl)-2-chloromehtyl-6-hydroxy-2H-pyran-3(6H)-one acetate. | 161–162 [a] |
| 166 | 122 | 2-(4-biphenylyl)-2-dthyl-6-hydroxy-2H-pyran-3(6H)-one acetate | 95–96 [a] |
| 167 | 124 | 2-(4-biphenylyl)-6-hydroxy-2-propyl-2H-pyran-3(6H)-one acetate | 96–97 [a] |

[1] For definitions of superscripts in this column see the footnotes to Table I.

EXAMPLE 168

2-(4-biphenylyl) - 6 - methoxy - 2H - pyran - 3(6H)-one (I; $R^1$=H, $R^2$=OCH$_3$, $R^3$=H and $R^4$=4-biphenylyl)

To a solution of 0.02 mole of 2-(4-biphenylyl)-6-hydroxy-2H-pyran-3(6H)-one, described in Example 94 in 150 ml. of acetone 0.06 mole of the alkyl iodide, iodomethane and 0.06 mole of silver oxide are added respectively with constant stirring. The mixture is stirred at room temperature overnight, filtered on diatomaeous earth ("Celite") and the filtrate evaporated to dryness to give a brown residue which is dissolved in ether and treated with charcoal. Evaporation leaves an orange oil which is passed through silica gel with 40% ether in hexane. The pure fractions are combined and recrystallized from methylcyclohexane to afford the title compound, M.P. 69–71° C.

The procedure of Example 168 may be followed to make other lower alkyl ether derivatives of Formula I in which $R^2$ is a lower alkoxy. In each case an amount of the appropriate 6 - hydroxy - 2H - pyran-3(6H)-one derivative of Formula IV, for instance, those prepared in Examples 81–150, equivalent to the amount of 2-(4-biphenylyl)-6-hydroxy-2H-pyran-3(6H)-one used in Example 168 is employed together with the appropriate alkyl halide. For example, in this manner, 2-(4-biphenylyl)-6-hydroxy-2-methyl-2H-pyran-3(6H)-one, may be employed with the alkyl iodides, methyl iodide, ethyl iodide or isopropyl iodide to yield 2-(4-biphenylyl) - 6 - methoxy-2-methyl-2H-pyran-3(6H)-one, M.P. 85–87° C., 2-(4-biphenylyl)-6-ethoxy-2-methyl-2H-pyran-3(6H) - one, M.P. 90–92° C., and 2-(4-biphenylyl)-6-isopropoxy-2-methyl-2H-pyran-3(6H)-one, M.P. 62–64° C., respectively.

EXAMPLE 169

2-(4-biphenylyl) - 2 - methyl - 6 - (tetrahydropyran-2-yloxy)-2H-pyran - 3(6H) - one (I; $R^1$=H, $R^2$=tetrahydropyranloxy, $R^3$=CH$_3$ and $R^4$=4-biphenylyl)

To a cold (10° C.) solution of 0.036 mole of 2-(4-biphenylyl)-6-hydroxy-2-methyl-2H-pyran-3(6H)-one, described in Example 83 in 200 ml. of benzene, 15 ml. of dihydropyran and 200 mg. of p-toluenesulphonic acid are added. The mixture is stirred 45 minutes, washed twice with saturated solution of sodium bicarbonate, twice with water, dried and evaporated to give a yellow oil which is subjected to chromatography on silica gel with 40% hexane in ether. The pure fractions are combined to afford the title compound as a slightly yellow oil $\gamma_{max.}^{CHCl_3}$ 1690, 1628, 1600, 1580, and 1557 cm.$^{-1}$ The procedure of Example 169 may be followed to make other tetrahydropyranyl ether derivatives of Formula I in which $R^2$ is a tetrahydropyranyloxy group. In each case an amount of appropriate 6-hydroxy-2H-pyran-3(6H)-one derivative of Formula IV, for instance those prepared in Examples 81–150, equivalent to the amount of 2-(4-biphenylyl) - 6 - hydroxy-2-methyl-2H-pyran-3(6H)-one used in Example 169 is employed. For example, in this manner, 2-(4-biphenylyl)-6-(tetrahydropyran-2-yloxy)-2H-pyran-3(6H)-one, $\gamma_{max.}^{CHCl_3}$ 1697, 1632, 1610 and 1600 cm.$^{-1}$ is obtained.

EXAMPLE 170

2-(diphenylmethyl)-6-methoxy - 6 - phenyl - 2H-pyran-3(6H)-one (I; $R^1$=phenyl, $R^2$=OCH$_3$, $R^3$=diphenylmethyl, and $R^4$=H)

2-(diphenylmethyl) - 6 - hydroxy-6-phenyl-2H-pyran-3(6H)-one (6.3 g.), prepared as described in Example 142, the lower alkanol, methanol (450 ml.), and 5 drops of 70% perchloric acid are stirred at room temperature for 5 to 10 minutes. The reaction mixture is poured into saturated sodium bicarbonate solution (20 ml.) Water is added and the mixture is extracted with ether. The ether extract is washed with water, dried over magnesium sulfate and evaporated to dryness. The residue is dissolved in isopropyl alcohol. The solution is treated with charcoal and then concentrated to yield the title compound as crystals, M.P. 118–119° C.: NMR (CDCl$_3$) δ2.83 (singlet, 3H), 5.07 (complex, 2H), 5.96 and 6.83 (doublet, J=10, 2H), 7.35 (multiplet, 10H).

The procedure of Example 170 may be followed to make other lower alkyl ether derivatives of Formula I in which $R^1$ is a lower alkyl, aryl or substituted aryl and $R^2$ is a lower alkoxy. In each case an amount of the appropriate 6-hydroxy-2H-pyran-3(6H)-one derivative of Formula IV in which $R^1$ is lower alkyl, aryl or substituted aryl, for instance, those prepared in Examples 139–149, equivalent to the amount of 2-(diphenylmethyl)-6-hydroxy-6-phenyl-2H-pyran-3(6H)-one used in Example 170 is employed together with the appropriate lower alkanol. For example, in this manner 2-diphenylmethyl-6-methoxy-6-methyl-2H-pyran-3(6H)-one, M.P. 109–110° C. and 2-diphenylmethyl-6-ethyl-6-methoxy - 2H - pyran-3(6H)-one M.P. 70°, are obtained from 2-diphenylmethyl-6-hydroxy-6-methyl-2H-pyran-3(6H)-one, described in Example 140 and 2-diphenylmethyl-6-ethyl-6-hydroxy-2H-pyran-3(6H)-one, described in Example 144, respectively, when methanol is used as the lower alkanol.

The procedure of Example 170 may be followed to make lower alkoxy(lower)alkyl ethers of Formula I by using the appropriate 6-hydroxy-2H-pyran-3(6H)-one derivative and replacing the lower alkanol with an appropriate lower alkoxyaliphatic ester. For example the use of 2-(4-biphenylyl)-6 - hydroxy-2-methyl-2H-pyran- 3(6H)-one and the replacement of methanol with an equivalent amount of 2-methoxyethyl acetate in Example 170 affords 2-(4-biphenylyl) - 6 - (2-methoxyethoxy)-2-methyl-2H-pyran-3(6H)-one, M.P. 67–69° C.

Similarly, the replacement of methanol with 2-methoxyethyl acetate or 2-ethoxyethyl acetate in Example 170 affords 2-(diphenylmethyl) - 6 - (2-methoxyethoxy)-6-phenyl-2H-pyran-3(6H)-one and 2-(diphenylmethyl)-6-(2-ethoxyethoxy)-6 - phenyl - 2H - pyran - 3(6H)-one, respectively.

The procedure of Example 170 may also be followed to make benzyl ethers of Formula I by using the appropriate 6-hydroxy-2H-pyran-3(6H)-one derivative and replacing the lower alkanol with benzyl alcohol. For example, the use of 2-(4-biphenylyl) - 6-hydroxy-2-methyl-2H-pyran-3(6H)-one and the replacement of methanol with an equivalent amount of benzyl alcohol in Example 170 affords 6-benzyloxy-2-(4-biphenylyl)-2-methyl-2H-pyran-3(6H)-one, M.P. 95–97° C. Similarly, the replacement of methanol with benzyl alcohol in Example 170 affords 6-benzyloxy-2-(diphenylmethyl) - 6 - phenyl - 2H-pyran-3(6H)-one, $\gamma_{max.}^{CHCl_3}$ 1690 and 1640 cm.$^{-1}$

EXAMPLE 171

5-benzyl-5-hydroxy-4-oxo-5-phenylpentenoic acid δ-lactone (V, R$^3$=phenyl and R$^4$=4-benzyl)

In a 500 ml., three necked round bottomed flask, fitted with a mechanical stirrer, a dropping funnel and a thermometer, 2-benzyl-6-hydroxy-2-phenyl-2H-pyran-3(6H)-one, described in Example 106, (14.0 g., 0.05 mole) is dissolved in acetone (182 ml.). The solution is cooled with an ice water bath and stirred vigorously. 8 N chromic acid (25 ml.) is added dropwise in such a way that the reaction temperature is kept between 0 and 10° C. After addition the reaction mixture is stirred at 0–1° C. for one hour. Isopropanol (16 ml.) is added slowly so that the reaction temperature is kept under 7° C. to decompose the excess of chromic acid. The reaction mixture is diluted with ethyl acetate-ether (1:3) (750 ml.) and water (300 ml.). Organic layer is washed with water, dried over anhydrous magnesium sulphate and concentrated to dryness to give yellow solid residue. Recrystallization of the residue from methanol and then from isopropanol and methanol gives the title compound as yellow crystals, M.P .127–128° C., $\gamma_{max.}^{CHCl_3}$ 1728, 1695, 1620 and 1595 cm.$^{-1}$ The procedure of Example 171 may be followed to prepare other ketolactones of Formula V, a subclass of the compounds of Formula I of this invention. In each case an equivalent amount of the appropriate 6-hydroxy-2H-pyran-3(6H)-one, for instance those described in Examples 81–138 is used instead of 2-benzyl-6-hydroxy-2-phenyl-2H - pyran - 3(6H) - one. Examples of other ketolactones of Formula V are listed in Tables VIII and IX. The notations for R$^3$ and R$^4$ have reference to Formula I above. It should be noted that those keto-lactones of Formula V in which R$^3$ represent H, which are capable of keto-enol tautomerism, see above, are designated by the name describing the more stable enolized form.

TABLE VIII

| Example | Starting material (Formula IV) R$^3$ | R$^4$ | Number of example describing starting material | Product (Formula V) | Physical constants [1] |
|---|---|---|---|---|---|
| 172 | CH$_3$ | phenyl | 81 | 5-hydroxy-5-phenyl-4-oxo-2-hexenoic acid δ-lactone. | 85–87 [a] |
| 173 | phenyl | Same as above | 84 | 5,5-diphenyl-5-hydroxy-4-oxo-2-pentenoic acid δ-lactone. | 118–120 [a] |
| 174 | H | do | 86 | 4,5-dihydroxy-5-phenyl-2,4-pentadienoic acid δ-lactone.[2] | 236–238 [a] |
| 175 | H | Cl-phenyl | 88 | 5-(p-chlorophenyl)-4,5-dihydroxy-2,4-pentadienoic acid δ-lactone.[2] | 248–249 [a] |
| 176 | H | biphenyl | 94 | 5-(4-biphenylyl)-4,5-dihydroxy-2,4-pentadienoic acid δ-lactone.[2] | 275–276 [a] |
| 177 | CH$_3$ | phenyl-CH$_2$CH$_2$- | 97 | 5-hydroxy-5-methyl-4-oxo-7-phenyl-2-heptenoic acid δ-lactone. | 1,725, 1,695 [c] |
| 178 | CH$_3$- | phenyl-phenyl | 83 | 5-(4-biphenylyl)-5-hydroxy-4-oxo-2-hexenoic acid δ-lactone. | 128–130 [a] |
| 179 | phenyl | CH$_3$-phenyl | 100 | 5-hydroxy-4-oxo-5-phenyl-5-(p-tolyl)-2-pentenoic acid δ-lactone. | 101.5–103 [a] |
| 180 | Same as above | 3,4-xylyl (CH$_3$, CH$_3$-phenyl) | 101 | 5-hydroxy-4-oxo-5-phenyl-5-(3,4-xylyl)-2-pentenoic acid δ-lactone. | 127–129 [a] |
| 181 | do | Cl-phenyl | 102 | 5-(p-chlorophenyl)-5-hydroxy-4-oxo-5-phenyl-2-pentenoic acid δ-lactone. | 74.5–76 [a] |
| 182 | Cl-phenyl | Cl-phenyl | 103 | 5,5-di(4-chlorophenyl)-5-hydroxy-4-oxo-2-pentenoic acid δ-lactone. | 81–83 [a] |
| 183 | phenyl | CH$_3$O-phenyl | 104 | 5-hydroxy-5-(4-methoxyphenyl)-4-oxo-5-phenyl-2-pentenoic acid δ-lactone. | 1,726, 1,695 [c] |

TABLE VIII—Continued

| Example | Starting material (Formula IV) R³ | Starting material (Formula IV) R⁴ | Number of example describing starting material | Product (Formula V) | Physical constants |
|---|---|---|---|---|---|
| 184 | H | CH₃O—⟨benzene ring⟩—, CH₃O— | 108 | 4,5-dihydroxy-5-(3,4-dimethoxy-phenyl)-2,4-pentadienoic acid δ-lactone.² | 209–211 ᵃ |
| 185 | CH₃— | CH₃— | 109 | 5-hydroxy-5-methyl-4-oxo-2-hexenoic acid δ-lactone. | 52–54/0.07 ᵇ |

¹ For definitions of the superscripts in this column see the footnotes to Table I.
² Enolized isomer of Formula V (Formula VII).

TABLE IX

| Ex. | Starting material (Formula IV) | Number of example describing starting material | Product (Formula V) | M.P., °C. |
|---|---|---|---|---|
| 186 | 2-hydroxy-1-oxaspiro[5.5]-undec-3-en-5-one. | 132 | 1-hydroxy-γ-oxocyclohexanecrotonic acid δ-lactone. | 79.5–81 |
| 187 | 10,11-dihydro-6′-hydroxyspiro[5H-dibenzo[a,d]-cycloheptene-5,2′-2′H-pyran-3′(6H)-one. | 135 | 4-(10,11-dihydro-5-hydroxy-5H-dibenzo-[a,d]cyclohepten-5-yl)-4-oxo-2-butenoic acid δ-lactone. | 170–171.5 |
| 188 | 6′hydroxyspiro[1,6,7,11b-tetrahydro-2H-dibenzo[cd,h]-azulene-[2,2′-2′H-pyran]-3′-(6′H)-one. | 136 | spiro[1,6,7,11b-tetrahydro-2H-dibenzo-[cd,h]-azulene-2,2′-2′H-pyran]-3′,6′-dione. | 151.5–153 |
| 189 | 7-chloro-2-hydroxy-1-oxospiro[5.5]-undec-3-en-5-one. | 137 | 2-chloro-1-hydroxy-γ-oxocyclohexane-crotonic acid δ-lactone. | 85–86 |

EXAMPLE 190

4-acetoxy-5-(p-chlorophenyl)-5-hydroxy-2,4-pentadienoic acid δ-lactone

Acetic anhydride (10 ml.) is added to 0.002 mole of 5-(p-chlorophenyl)-4,5-dihydroxy-2,4 - pentadienoic acid δ-lactone, described in Example 175, and the mixture is heated on a steam bath overnight. Benzene is added and the solution is washed with water, sodium bicarbonate and twice with a saturated solution of sodium chloride. Evaporation of the solvent gives a red oil which is crystallized from ether by addition of hexane. Further recrystallization from methylcyclohexane affords the pure title compound as a yellow solid; M.P. 107–109° C.

The procedure of Example 190 may be followed to prepare the corresponding enol acylates of the compounds of Formula V in which R³ is hydrogen, which are further defined above by Formulae VI⇌VII, a subclass of the compounds of this invention of Formula I, by using an equivalent amount of the appropriate compound of Formula V in which R³ is a hydrogen, instead of 5-(p-chlorophenyl)-4,5-dihydroxy-2,4-pentadienoic acid lactone, with an equivalent amount of the appropriate acyl anhydride. Examples of other such enol acylates prepared in this manner are: 4 - acetoxy-5-(4-biphenylyl)-5-hydroxy-2,4-pentadienoic acid δ-lactone, M.P. 129–131° C., prepared from the product of Example 176; 4 - acetoxy - 5 - hydroxy - 5 - phenyl-2,4-pentadienoic acid δ-lactone, M.P. 70–71° C., prepared from the product of Example 174, and 4 - acetoxy-5-hydroxy-5-(3,4-dimethoxyphenyl)-2,4-pentadienoic acid δ-lactone, M.P. 147–148° C., prepared from the product of Example 184.

EXAMPLE 191

10,11-dihydro-5-methoxymethyl-5H-dibenzo[a,d]cyclohepten-5-ol

A solution of chloromethyl methyl ether (40.2 g., 0.5 mole, freshly distilled) in dry tetrahydrofuran (80 ml.) is prepared, and about 5 ml. of that solution are added to a stirred mixture of magnesium turnings (12.0 g., 0.5 g.-atom) and mercuric chloride (500 mg.) in tetrahydrofuran (20 ml.) until an exothermic reaction ensues. The flask is cooled to 0° ±10° C. and the remainder of the chloromethyl methyl ether solution is added dropwise with thorough agitation. After completion of addition a solution of 10,11-dihydro-5H-dibenzo[a,d]cyclohepten-5-one (56.1 g., 0.25 mole) in tetrahydrofuran is added dropwise. The reaction mixture is stirred overnight at room temperature and the complex is hydrolyzed with ice-cold ammonium chloride solution. The aqueous layer is extracted with ether (3× 100 ml.) and the combined extracts are washed with sodium chloride solution, dried and evaporated under reduced pressure to give 10,11-dihydro - 5 - methoxymethyl - 5H - dibenzo[a,d]cyclohepten-5-ol as an oil with B.P. 143–144° C./0.05 mm., $\gamma_{max.}^{film}$ 3500 cm.⁻¹ 2820 cm.⁻¹

10,11 - dihydro - 5H - dibenzo[a,d]cyclohepten-5-one, used in this example, is described by S. O. Winthrop et al., J. Org. Chem., 27, 230 (1962).

EXAMPLE 192

10,11-dihydro-5H-dibenzo[a,d]cycloheptene-5-carboxaldehyde

A solution of 10,11-dihydro-5-methoxymethyl-5H-dibenzo[a,d]cyclohepten-5-ol (52.0 g., 0.21 mole), described in Example 191, and formic acid (60 ml.) is heated under refluxing conditions for three hours. The mixture is cooled, diluted with water (500 ml.) and the oil is extracted into benzene. Evaporation of the solvent yields the crude aldehyde as a viscous oil.

The product is stirred overnight at room temperature with a solution of "Girard-T" reagent (40 g.) in methanol (400 ml.). The precipitate is combined with the residue obtained on evaporation of the methanol. The Girard adduct is dissolved in water and the solution is extracted with ether (6× 100 ml.) to remove non-carbonylic impurities. Hydrolysis of the adduct is effected by stirring the aqueous solution overnight (25° C.) with 40% sulfuric acid. The precipitated product is filtered off, washed well with water and dried to yield 10,11-dihydro-5H-dibenzo[a,d]cycloheptene-5-carboxaldehyde as a solid with M.P. 76–77° C. which may be purified by distillation (B.P. 135–138° C./0.2–°.3 mm. Hg), or by recrystallization from cyclohexane to M.P. 78° C., $\gamma_{max.}^{CHCl_3}$ 2700 (C—H stretching); 1720 cm.⁻¹ (CHO)

The compound is also characterized as the 2,4-dinitrophenylhydrazone, M.P. 217° C. (from acetic acid)

$\gamma_{max.}^{CHCl_3}$ 3300 (NH); 1610 (C=N); 1315, 1510 cm.⁻¹ (NO₂)

EXAMPLE 193

2-(10,11-dihydro-5H-dibenzo[a,d]cyclohepten-5-yl)-6-hydroxy-2H-pyran-3(6H)-one To a solution (0° C.) of 1.6 mole of distilled furan in 1 litre of anhydrous ether one mole of n-butyllithium in hexane is added. The mixture is stirred for one hour, cooled to 10° C. and 0.7 mole of 10,11-dihydro-5H-dibenzo[a,d]cycloheptene - 5 - carboxaldehyde, prepared as described in Example 192, is added portionwise and the reaction temperature kept at 10–20° C. The mixture is stirred half an hour at room temperature, cooled and 250 ml. of water is added dropwise. The organic layer is washed twice with water, dried and evaporated to give a solid which is crystallized from ether by addition of hexane. This solid, melting at 97–99° C., is dissolved in 1.3 litre of chloroform, cooled to 10° C. and 220 ml. of 40% peracetic acid is added dropwise. The solution is stirred at room temperature for two hours, washed with water, sodium carbonate solution, potassium iodide solution, sodium thiosulfite solution, sodium bicarbonate solution and then water. The organic solution is dried over magnesium sulfate, and evaporated to yield an oil. Crystallization of the oil from methylcyclohexane affords the title compound, M.P. 150–152° C., $\gamma_{max.}^{CHCl_3}$ 3580, 3440, 1688 and 1625 cm.$^{-1}$

I claim:
1. A compound of the formula

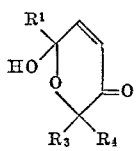

wherein $R^1$ is hydrogen or lower alkyl of 1 to 4 carbon atoms; $R^3$ is hydrogen, lower alkyl of 1 to 3 carbon atoms, chloromethyl, phenyl or chlorophenyl; and $R^4$ is phenyl, lower alkyl phenyl in which the alkyl substituent is of 1 to 3 carbon atoms, xylyl, chlorophenyl, dichlorophenyl, nitrophenyl, p-benzyloxyphenyl, and 4-biphenylyl.

2. 2-(p - benzyloxyphenyl) - 6 - hydroxy - 2H - pyran-3(6H)-one, as claimed in claim 1.
3. 2-(4-biphenylyl)-6-hydroxy - 2H - pyran-3(6H)-one, as claimed in claim 1.
4. 2-(4-biphenylyl)-6-hydroxy - 6 - methyl-2H-pyran-3(6H)-one, as claimed in claim 1.
5. 2-(4-biphenylyl)-6-hydroxy - 2 - methyl-2H-pyran-3(6H)-one, as claimed in claim 1.
6. 2-(4-biphenylyl)-2-chloromethyl - 6 - hydroxy-2H-pyran-3(6H)-one, as claimed in claim 1.
7. 2-(4-biphenylyl)-6-hydroxy - 2 - propyl-2H-pyran-3(6H)-one, as claimed in claim 1.
8. 2,2-diphenyl - 6 - hydroxy-2H-pyran-3(6H)-one, as claimed in claim 1.
9. 2-(4-biphenyl) - 6 - hydroxy - 2 - phenyl-2H-pyran-3(6H)-one, as claimed in claim 1.
10. 6-hydroxy - 2 - phenyl - 2H - pyran-3(6H)-one, as claimed in claim 1.
11. 2-(4-biphenylyl)-2-ethyl - 6 - hydroxy-2H-pyran-3(6H)-one, as claimed in claim 1.
12. 2-(4-biphenylyl)-6-hydroxy - 6 - methyl-2-phenyl-2H-pyran-3(6H)-one, as claimed in claim 1.
13. 6-hydroxy - 2 - methyl-2-phenyl-2H-pyran-3(6H)-one, as claimed in claim 1.
14. 6-hydroxy - 2 - phenyl-2-(3,4-xylyl) - 2H - pyran-3(6H)-one, as claimed in claim 1.
15. 2-(2,4-dichlorophenyl) - 6 - hydroxy - 2H - pyran-3(6H)-one, as claimed in claim 1.
16. 2-[4'-chloro(4-biphenylyl)]-6-hydroxy - 2 - methyl-2H-pyran-3(6H)-one.
17. 2-(diphenylmethyl)-6-hydroxy - 2H - pyran-3(6H)-one.
18. 6-hydroxy-2H-pyran-3(6H)-one.
19. 2,2-dimethyl-6-hydroxy-2H-pyran-3(6H)-one.
20. A compound of the formula

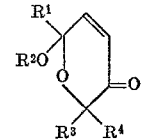

wherein $R^1$ is hydrogen or lower alkyl of 1 to 4 carbon atoms; $R^2$ is methyl, methoxyethyl, isopropyl, benzyl, or lower alkanoyl of 2 to 7 carbon atoms; $R^3$ is hydrogen, lower alkyl of 1 to 3 carbon atoms, chloromethyl, phenyl or chlorophenyl; and $R^4$ is phenyl, lower alkyl phenyl in which the alkyl substituent is of 1 to 3 carbon atoms, xylyl, chlorophenyl, dichlorophenyl, nitrophenyl, p-benzyloxyphenyl, or 4-biphenylyl.

21. 2-(4-biphenylyl) - 6 - hydroxy - 2H - pyran-3(6H)-one acetate, as claimed in claim 20.
22. 2-(4-biphenylyl) - 6 - hydroxy - 2H - pyran-3(6H)-one butyrate, as claimed in claim 20.
23. 2-(4 - biphenylyl) - 6 - methoxy-2H-pyran-3(6H)-one, as claimed in claim 20.
24. 2-(4-biphenylyl)-6-hydroxy - 2 - methyl-2H-pyran-3(6H)-one acetate, as claimed in claim 20.
25. 2-(4-biphenylyl)-6-methoxy - 2 - methyl-2H-pyran-3(6H)-one, as claimed in claim 20.
26. 2-(4-biphenylyl)-6-(2-methoxyethoxy) - 2 - methyl-2H-pyran-3(6H)-one, as claimed in claim 20.
27. 2-(4-biphenylyl)-2-chloromethyl - 6 - methoxy-2H-pyran-3(6H)-one, as claimed in claim 20.
28. 2-(4-biphenylyl)-2-chloromethyl - 6 - hydroxy-2H-pyran-3(6H)-one acetate, as claimed in claim 20.
29. 6-hydroxy - 2 - phenyl-2H-pyran-3(6H)-one 6-acetate, as claimed in claim 20.
30. 2-(p-benzyloxyphenyl) - 6 - hydroxy - 2H - pyran-3(6H)-one 6-acetate, as claimed in claim 20.
31. 2-(4-biphenylyl)-2-ethyl - 6 - hydroxy-2H-pyran-3(6H)-one 6-acetate, as claimed in claim 20.
32. 2-(4-biphenylyl) - 6 - hydroxy - 2H - pyran-3(6H)-one 6-heptanoate, as claimed in claim 20.
33. 2-(4-biphenylyl) - 6 - isopropoxy - 2 - methyl-2H-pyran-3(6H)-one, as claimed in claim 20.
34. 6-benzyloxy - 2 - (4 - biphenylyl) - 2 - methyl-2H-pyran-3(6H)-one, as claimed in claim 20.
35. 2-(4-biphenylyl) - 6 - hydroxy - 2H - pyran-3(6H)-one 6-chloroacetate.
36. 2-(4-biphenylyl)-6-hydroxy - 2 -methyl-2H-pyran-3(6H)-one 6-p-nitrobenzoate.
37. 2-[(4'-chloro - (4 - biphenylyl))] - 6 - hydroxy-2-methyl-2H-pyran-3(6H)-one acetate.

References Cited
UNITED STATES PATENTS
3,159,653    12/1964    Falbe et al.  _____ 260—345.9

DONALD G. DAUS, Primary Examiner
A. M. T. TIGHE, Assistant Examiner

U.S. Cl. X.R.
260—343.5, 345.9, 347.8; 424—283

UNITED STATES PATENT OFFICE
CERTIFICATE OF CORRECTION

Patent No. 3,751,434　　　　　　　Dated August 7, 1973

Inventor(s) Yvon Lefebvre

It is certified that error appears in the above-identified patent and that said Letters Patent are hereby corrected as shown below:

Column 2, line 11, "a lower alkoxy(lower-alkoxy" should read --a lower alkoxy(lower)alkoxy--

Column 2, line 25, should be deleted and replaced by the following (end of line 24) --p-fluorophenyl, o-iodophenyl, 2,4-dichlorophenyl, p-nitrophenyl--

Column 3, line 73, "2-(4-bisphenyl)" should read --2-(4-biphenylyl)--

Column 6, line 13, "$R^4 = CR_3CH=CH-$)" should read --$R^4 = CH_3CH=CH-$)--

Column 10, Table I, Example 8, the structure be

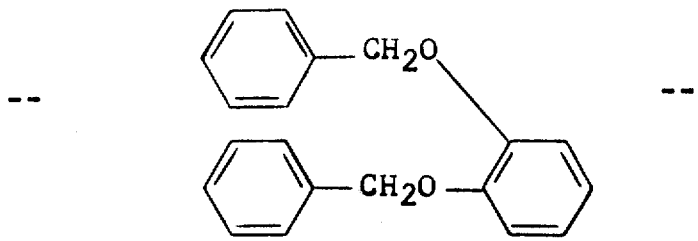

UNITED STATES PATENT OFFICE
CERTIFICATE OF CORRECTION

Patent No. 3,751,434                    Dated August 7, 1973

Inventor(s) Yvon Lefebvre

It is certified that error appears in the above-identified patent and that said Letters Patent are hereby corrected as shown below:

Page 2.

Column 12, Table I, Example 26; Column 21, Table V, Example 108 and Column 31, Table VIII, Example 184, the structure should be

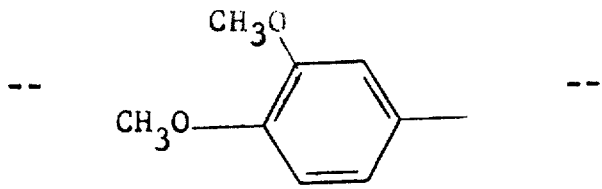

Column 24, Table VI, Example 135 "5-(2'-furyl)-19,11-" should read --5-(2'-furyl)-10,11- --

Column 26, line 61, "dichloromethne" should read --dichloromethane--

Column 27, Example 166, "2-dthyl" should read --2-ethyl--.

Signed and sealed this 19th day of March 1974.

(SEAL)
Attest:

EDWARD M. FLETCHER, JR.            C. MARSHALL DANN
Attesting Officer                   Commissioner of Patents